United States Patent [19]

Hiroi

[11] Patent Number: 4,755,924
[45] Date of Patent: Jul. 5, 1988

[54] PROCESS CONTROLLER HAVING AN ADJUSTMENT SYSTEM WITH TWO DEGREES OF FREEDOM

[75] Inventor: Kazuo Hiroi, Hachiooji, Japan
[73] Assignee: Kabushiki Kaisha Toshiba, Kawasaki, Japan
[21] Appl. No.: 829,606
[22] Filed: Feb. 14, 1986

[30] Foreign Application Priority Data

| Feb. 19, 1985 | [JP] | Japan | 60-29442 |
| Feb. 19, 1985 | [JP] | Japan | 60-29441 |
| Feb. 27, 1985 | [JP] | Japan | 60-38338 |
| Jun. 19, 1985 | [JP] | Japan | 60-131925 |
| Jul. 6, 1985 | [JP] | Japan | 60-148510 |
| Jul. 6, 1985 | [JP] | Japan | 60-148511 |
| Jul. 8, 1985 | [JP] | Japan | 60-148354 |
| Jul. 19, 1985 | [JP] | Japan | 60-165729 |

[51] Int. Cl.[4] .................................... G05B 13/00
[52] U.S. Cl. ................... 364/148; 364/160; 364/162; 364/176
[58] Field of Search .......... 364/148, 160–165, 364/176, 177, 553; 318/561, 609, 610, 615

[56] References Cited

U.S. PATENT DOCUMENTS

| 3,644,719 | 2/1972 | Rouxel et al. | 364/161 |
| 3,758,762 | 9/1973 | Littman et al. | 364/165 |
| 4,052,642 | 10/1977 | Speth et al. | 364/165 |
| 4,500,950 | 2/1985 | Putman | 364/164 |

FOREIGN PATENT DOCUMENTS

| 0097101 | 6/1982 | Japan | 364/162 |
| 0003503 | 1/1984 | Japan | 364/161 |

OTHER PUBLICATIONS

Chapter Six; Design of Feedback Control System for Independent Control of Transmission and Sensitivity Functions; pp. 246–255.

Primary Examiner—Jerry Smith
Assistant Examiner—Allen MacDonald
Attorney, Agent, or Firm—Foley & Lardner, Schwartz, Jeffery, Schwaab, Mack, Blumenthal & Evans

[57] ABSTRACT

A process controller comprises a deviation calculating device for calculating the deviation between a control value obtained from a controlled object and a set value for the control value, and a first operation device for performing at least one of proportional, integral and differential operations with respect to the deviation from the deviation calculating device based on control parameters adjusted in a characteristic state for optimally restricting variation due to a disturbance. The first operation device outputs an adjusting signal based on the at least one of proportional, integral and differential operations. The process controller further comprises a second calculating device for correcting the control parameters to parameter values in a characteristic state for optimally following change in the set value.

18 Claims, 38 Drawing Sheets

PRIOR ART
FIG. 2

| CONTROL OBJECT | INPUT TYPE | MODE | $K_P$ | $T_I$ | $T_D$ | NOTE |
|---|---|---|---|---|---|---|
| $\frac{1}{1+T \cdot S} e^{-LS}$ | DISTURBANCE | P<br>PI<br>PID | 0.3 T/KL<br>0.6 T/KL<br>0.95 T/KL | —<br>4L<br>2.4L | —<br>—<br>0.4L | NO OVERSHOOT MINIMUM SETTLING TIME |
| $\frac{1}{1+T \cdot S} e^{-LS}$ | DISTURBANCE | P<br>PI<br>PID | 0.7 T/KL<br>0.7 T/KL<br>1.2 T/KL | —<br>2.3L<br>2L | —<br>—<br>0.42L | 20% OVERSHOOT MINIMUM SETTLING TIME |
| $\frac{1}{1+T \cdot S} e^{-LS}$ | SET POINT VALUE | P<br>PI<br>PID | 0.3 T/KL<br>0.35 T/KL<br>0.6 T/KL | —<br>1.2 T<br>T | —<br>—<br>0.5L | NO OVERSHOOT MINIMUM SETTLING TIME |
| $\frac{1}{1+T \cdot S} e^{-LS}$ | SET POINT VALUE | P<br>PI<br>PID | 0.7 T/KL<br>0.6 T/KL<br>0.59 T/KL | —<br>T<br>1.35T | —<br>—<br>0.47L | 20% OVERSHOOT MINIMUM SETTLING TIME |

| CONTROL SYSTEM \ PID PARAMETER | $K_P$ | $T_I$ (min) | $T_D$ (min) |
|---|---|---|---|
| PID (OPTIMUM PARAMETERS FOR DISTURBANCE) | ($K_{PD}$) 0.188 | ($T_{ID}$) 14.6 | ($T_{DD}$) 1.98 |
| I-PD | | | |
| PID (OPTIMUM PARAMETERS FOR SET POINT VALUE) | ($K_{PS}$) 0.126 | ($T_{IS}$) ∞ | ($T_{DS}$) 2.04 |

(A) PID (OPTIMUM PARAMETER FOR DISTURBANCE)
(B) I-PD
(C) PID (OPTIMUM PARAMETER FOR SET POINT VALUE)

(A) PID (OPTIMUM PARAMETER FOR DISTURBANCE)
(B) I-PD
(C) PID (OPTIMUM PARAMETER FOR SET POINT VALUE)

FIG.13

| NO | MODE FOR 39 | EQUATION FOR 39 | EQUATION FOR 47 | SUB NO | $\alpha$ | $\beta$ | | OVERALL MODE |
|---|---|---|---|---|---|---|---|---|
| 1 | STANDARD PI | $K_P(1+\dfrac{1}{T_i \cdot S})$ | $\dfrac{1+\alpha \cdot T_i \cdot S}{1+T_i \cdot S}$ | 1.1 | 1 | — | STANDARD PI | 1 |
| | | | | 1.2 | 0 | — | I-P | 2 |
| | | | | 1.3 | $0<\alpha<1$ | — | P-I-P | 2 |
| 2 | STANDARD PID | $K_P(1+\dfrac{1}{T_i \cdot S}+T_D \cdot S)$ | $\dfrac{1+\alpha \cdot T_i \cdot S + \delta \cdot T_i \cdot T_D \cdot S^2}{1+T_i \cdot S + T_i \cdot T_D \cdot S^2}$ | 2.1 | 1 | 1 | STANDARD PID | 1 |
| | | | | 2.2 | 0 | 0 | I-PD | 2 |
| | | | | 2.3 | $0<\alpha<1$ | 0 | P-I-PD | 2 |
| | | | | 2.4 | 0 | $0<\delta<1$ | D-I-PD | 2 |
| | | | | 2.5 | $0<\alpha<1$ | $0<\delta<1$ | PD-I-PD | 2 |
| 3 | HIGH PERFORMANCE PID | | $\left(\dfrac{1+\alpha \cdot T_i \cdot S}{1+T_i \cdot S}\right) \times \left(\dfrac{1+\delta T_D \cdot S}{1+\gamma \delta T_D \cdot S}\right)$ | 3.1 | 1 | 0 | I-PD | 1 |
| | | | | 3.2 | 0 | 0 | I-PD | 2 |
| | | | | 3.3 | $0<\alpha<1$ | 0 | P-I-PD | 2 |
| | | | | 3.4 | 0 | $0<\delta<2$ | D-I-PD | 2 |
| | | | | 3.5 | $0<\alpha<1$ | $0<\delta<2$ | PD-I-PD | 2 |
| | | | | 3.6 | 1 | 1 | STANDARD PID | 1 |

FIG.14 (A) SV
FIG.14 (B) PV
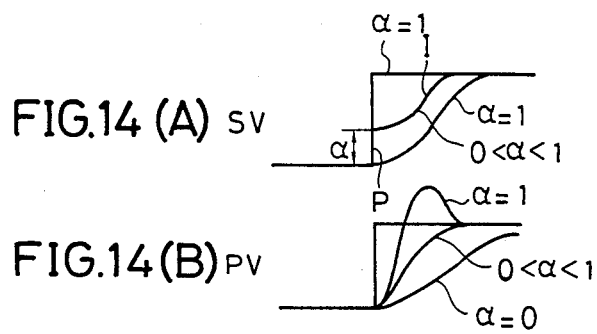
FIG.15
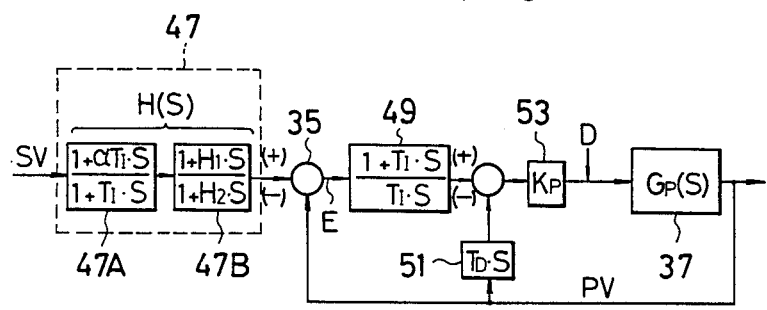
FIG.16
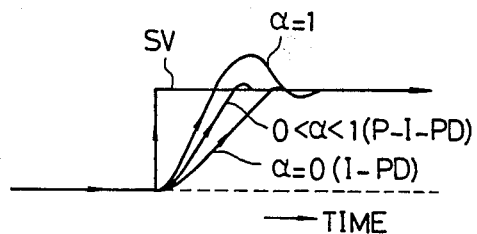

PID PARAMETERS (FOR DISTURBANCE)

$$\begin{cases} K_P = 2.59 \\ T_I = 3.41 \\ T_D = 0.56 \end{cases}$$

PID PARAMETERS: SET FOR DISTURBANCE

FIG. 48

| NO | α | β | γ | OVERALL CONTROL ALGORITHM | NOTE |
|---|---|---|---|---|---|
| 1 | 1 | 0 | 1 | GENERAL PID CONTROL | |
| 2 | 1 | 0 | 0 | PI-D CONTROL | PID WITH DIFFERENTIATION ON PV |
| 3 | 0 | 0 | 0 | I-PD CONTROL | |
| 4 | α | 0 | 0 | P-I-PD CONTROL | 2 DEGREES OF FREEDOM FOR P ONLY |
| 5 | α | β | 0 | PI-PID CONTROL | 2 DEGREES OF FREEDOM FOR PI ONLY |
| 6 | α | β | γ | PID-PID CONTROL | 2 DEGREES OF FREEDOM FOR ALL OF PID |

FIG. 55

| NO | $H(S) \cdot C^*(S)$ | $C^*(S)$ | COMPENSATION OPERATION | SUB NO | COEFFICIENT $\alpha$ | COEFFICIENT $\delta$ | CONTROL MODE |
|---|---|---|---|---|---|---|---|
| 1 | $Kp(1+\frac{1}{T_I \cdot S})$ STANDARD PI | $Kp(\alpha+\frac{1}{T_I \cdot S})$ | $\frac{1+T_I \cdot S}{1+\alpha \cdot T_I \cdot S}$ | 1.1 | L | — | STANDERD PI |
|   |   |   |   | 1.2 | 0 | — | I-P |
|   |   |   |   | 1.3 | 0<1<1 | — | P-I-P |
| 2 | $Kp(1+\frac{1}{T_I \cdot S})(\frac{1+T_D \cdot S}{1+\eta \cdot T_D \cdot S})$ INTERFERE-TYPE PID | $Kp(\alpha+\frac{1}{T_I \cdot S})(\frac{1+\delta \cdot T_D \cdot S}{1+\eta \cdot T_D \cdot S})$ | $(\frac{1+T_I \cdot S}{1+\alpha \cdot T_I \cdot S})(\frac{1+T_D \cdot S}{1+\delta \cdot T_D \cdot S})$ | 2.1 | 1 | 1 | PID |
|   |   |   |   | 2.2 | 0 | 0 | I-PD |
|   |   |   |   | 2.3 | 0 | 1 | IP-P |
|   |   |   |   | 2.4 | 0<α<1 | 0 | P-I-PD |
|   |   |   |   | 2.5 | 0<α<1 | 0<δ<1 | PD-I-PD |
| 3 | $Kp(1+\frac{1}{T_I \cdot S}+T_D \cdot S)$ GENERAL PID | $Kp(\alpha+\frac{1}{T_I \cdot S}+\beta \cdot T_D \cdot S)$ | $\frac{1+T_I \cdot S+T_I \cdot T_D \cdot S^2}{1+\alpha \cdot T_I \cdot S+\delta \cdot T_I \cdot T_D \cdot S^2}$ | 3.1 | 1 | 1 | GENERAL PID |
|   |   |   |   | 3.2 | 0 | 0 | I-PD |
|   |   |   |   | 3.3 | 0<α<1 | 0 | P-I-PD |
|   |   |   |   | 3.4 | 0 | 0<δ<1 | D-I-PD |
|   |   |   |   | 3.5 | 0<α<1 | 0<δ<1 | PD-I-PD |

4,755,924

PROCESS CONTROLLER HAVING AN ADJUSTMENT SYSTEM WITH TWO DEGREES OF FREEDOM

BACKGROUND OF THE INVENTION

1. Technical Field of the Invention

The present invention relates to a controller which is used for process control, in particular, to a controller which excels in both set point value following characteristics and external disturbance suppression characteristics.

2. Prior Art

Due to an increase in process operating needs such as (1) resources saving and energy saving, (2) reduction in personnel and saving power, (3) uniformization and high quality of products, (4) safety, and (5) flexibility, process control is being required to possess an increasingly high controllability, and various means have been devised attempting to attain this objective.

In operating a plant, in particular, a continuous process or the like, if the control of the system is disturbed even by a small amount because of various factors such as changes in yield in upstream processing, various external disturbances, changes in the set point value due to optimization cascading control, and so forth, downstream processing is influenced in a chain-reaction manner. Accordingly, the fundamental principle for control is to improve the controllability of the individual control system to its extremes. Recently, there have been frequent cases in which large disturbances are generated such as changes in load during operation, along with the flexibility of plant operation and energy conservation, or there are frequent and large changes in the set point value due to optimization, cascading control, set point value control, and so forth.

In such circumstances two problems occur when implementing the above requirements, (1) attaining a desired system response against changes in a set point value, and (2) achieving sufficient feedback to handle disturbances. Prior art controllers, however, have not been configured to cope simultaneously and sufficiently with the two problems. In particular, it is desired to accomplish a satisfactory adjustment of integral time which is likely to cause inconsistency between the characteristics for following the change in the set point value and the characteristics for suppressing influences due to disturbances.

BRIEF DESCRIPTION OF THE DRAWINGS

FIG. 2 shows the control constants related to CHR method.

FIG. 13 shows the transfer functions of second to fourth embodiments of the present invention.

FIG. 14(A) shows the output of the lead/lag operation.

FIG. 14(B) shows the changes in the processed value PV.

FIG. 15 is a functional block diagram for illustrating the structure of a fourth embodiment of the present invention.

FIG. 16 is an explanatory graph showing how the characteristics of the system are adjusted by varying the parameter according to the invention.

FIGS. 20, 21 and 22 are block diagrams showing another configuration of the compensation operation units of a fifth embodiment.

FIG. 23 is a functional block diagram for illustrating the structure of a sixth embodiment of the present invention.

FIG. 48 displays various control forms according to the twentieth embodiment.

FIG. 55 displays various control forms according to the twenty-second embodiment.

SUMMARY OF THE INVENTION

In accordance with the present invention, a process controller is provided that is capable of adjustment of operational parameters with two degrees of freedom which may be much more easily and accurately accomplished to cope with disturbances and changes in setpoint value. Briefly described, a primary object of the invention is to provide an improved process controller with two degrees of freedom. In particular, the present invention makes it possible to sufficiently adjust integral time.

DETAILED DESCRIPTION OF THE INVENTION

To facilitate the understanding of difficulties which prior art encounters, brief reference will be made to conventional control systems.

CONVENTIONAL CONFIGURATIONS OF CONTROL SYSTEMS

Figure 1:
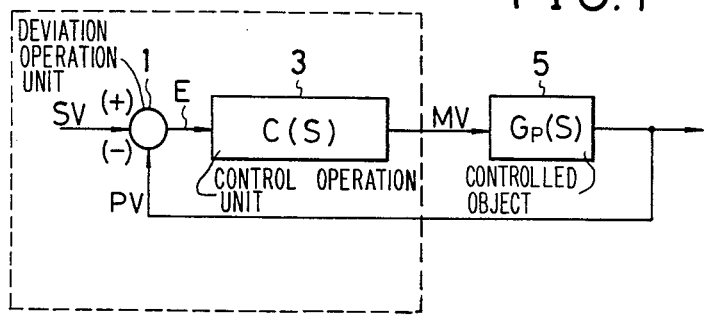
FIG. 1 is a functional block diagram of a general process controller of the prior art.

FIG. 1 is a functional block diagram of a general process controller of the prior art. In the figure, 1 is a deviation operation unit, 3 is a control operation unit, and 5 is a controlled object. The deviation operation unit 1 computes the deviation E (=SV−PV) between the control value PV that is fed back from the controlled object 5 and the set point value SV. The control operation unit 3 carries out each of the proportional, integral, and differential operations for the deviation E based on the transfer function C(s) given by Eq. (1), determines an adjusted operational output MV to bring the control value PV equal to the set point value SV, and outputs the derivation E to the control operation unit 3. In the control operation unit 3, an adjusted operational output MV is output as a manipulated value, and when a disturbance is generated in the control system due to impression of a disturbance D, it is detected as a variation in the control value PV.

$$C(s) = K_p \left( 1 + \frac{1}{T_I \cdot s} + \frac{T_D \cdot s}{1 + \gamma \cdot T_D \cdot s} \right) \quad (1)$$

In the above equation, Kp, $T_I$, and $T_D$ are the control constants of the transfer function C(s), each representing the proportional gain, integral time, and derivative time, respectively. Further, s is a complex variable and $\gamma$ is a constant in a range such as 0.1–0.3.

The response characteristics of the controller is determined, as may be seen from the transfer function shown by Eq. (1), by adjusting the control constants Kp, $T_I$, and $T_D$. In ordinary control systems, the control constants Kp, $T_I$, and $T_D$ are adjusted to a state which can quickly suppress the influence of the disturbance when it is applied to the process, that is, a state having optimum characteristics for suppressing the disturbance.

However, if the set point value SV is changed when the control constants are set to the optimum characteristics for suppressing the disturbance, the control value PV is unable to follow the change in the set point value SV, and overshoot is generated. Further, if the control constants are set to a state in which the control value PV follows the change in the set point value SV optimally, that is, to an optimum condition of characteristics for following set point value SV, then the suppression characteristics for the disturbance is insufficient so that it takes a long time to respond.

As in the above, the values of the control constants for the optimum condition of characteristics for suppressing disturbance and those for the optimum condition of characteristics for following the set point value differ markedly. This can be understood by examining the adjusting formula for the control constants due to the CHR (Chien, Hrones, and Reswick) method shown in FIG. 2.

Now, for the transfer function of the control operation unit 3, only one kind of control constant for each of Kp, $T_I$, and $T_D$ can be set. For this reason, in conventional devices, either one of the two sets of the control constants is selected in consideration of the system characteristics (for instance, responsive force for a disturbance) of the controlled object 3 or the kind of control (for instance, the form of change in the set point value), thereby sacrificing the other set, or making a compromise at a response which is tolerable for both of the conditions.

Figure 3:
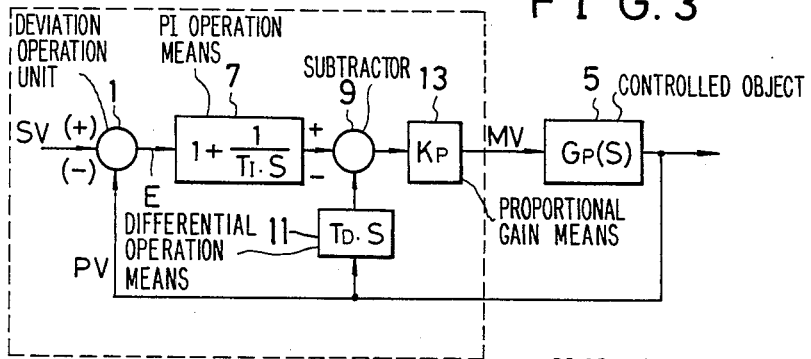
FIG. 3 is a functional diagram of another prior art process controller.

Another prior art process controller is shown in FIG. 3. This is a PID controller with differentiation for the control value PV. Namely, the PI operation is applied at a PI operation means 7 to the deviation E between the set point value SV and the process value PV. The output of the differential operation on the process value PV at the differential operation means 11 is subtracted from the output of the PI operation means 7 by subtractor 9. The result is inputted to a proportional gain means 13 and is multiplied by a proportional gain Kp. The resulting signal is transmitted on a controlled object 5 as a manipulated signal MV, and a control is carried out to bring the process value PV equal to the set point value SV. This controller, however, is not able to cope with both disturbances and changes in the set point value.

Figure 4:
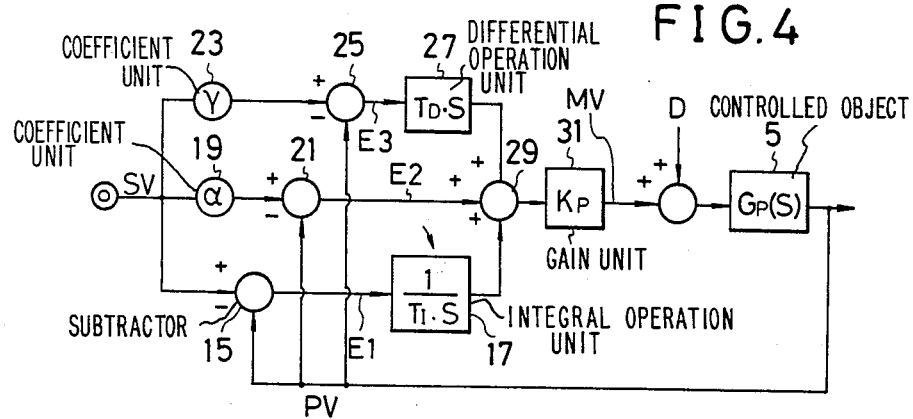
FIG. 4 is a block diagram showing a separation type process controller.

To solve the above problems, some configurations with two degrees of freedom have been conceived. FIG. 4 is a block diagram showing a separation type process controller to which two degrees of freedom is applied.

As shown by FIG. 4, in the prior process controller, the deviation E1 (=SV−PV) between the set point value SV and the control value PV is determined in a subtractor 15, and the deviation E1 undergoes an integral operation in the integral operation unit 17.

On the other hand, after the set point value SV is multiplied by a coefficient $\alpha$ in a coefficient unit 19, the deviation E2 (=$\alpha$SV−PV) is calculated in a subtractor 21 (which is a proportional operation).

Further, the set point value SV is multiplied by a coefficient $\gamma$ in a coefficient unit 23, the deviation E3 (=$\gamma$SV−PV) is calculated by subtracting the control value PV from the above result in a subtractor 25, and the deviation E3 is differentiated in a differential operation unit 27.

Then, the integrated output, the deviation E2, and the differentiated output are additively synthesized in an adder 29, and after it is multiplied by a proportional gain Kp in a proportional gain unit 31, the result is supplied to a controlled object 5 as a manipulated signal MV.

In the above prior controller, the control constants, namely, the proportional gain Kp, the integral time $T_I$, and the derivative time $T_D$ are adjusted, when a disturbance D is applied to the controlled object 5, to a state in which its effects are quickly suppressed, namely, in optimum condition of characteristics for suppressing the disturbance. For a change in the set point value SV, the controller attempts to follow the change in the set point value by adjusting the coefficient $\alpha$ for adjusting the proportional gain and the coefficient $\gamma$ for adjusting the derivative time.

However, in the prior device, no compensation is given to the integral time $T_I$ which plays a central control role in the integration operation, though compensation is given for the proportional gain Kp and the derivative time $T_D$ by adjusting the coefficients $\alpha$ and $\gamma$, thereby causing the following problems.

Namely, the integral time of the control system is determined, as an optimum value for suppressing disturbance, by the period of a dead time (L) of the controlled object, and is determined, as an optimum value for following the set point value, by the magnitude of the time constant T. There is a great difference between the dead time L and the time constant T, and moreover, the larger the time difference between them, the characteristics for following set point value are worse, when the characteristics for suppressing disturbance is optimized. Therefore, the prior controller is incomplete as a two degrees of freedom PID controller, and it is totally impractical for a plant and others where a large number of PID controllers have to be employed.

Here, the following model will be adopted as a model $G_P(s)$ for an astatic process.

$$G_P(s) = e^{-5s}/\{S(1+S)\}$$

Figures 5, 6:
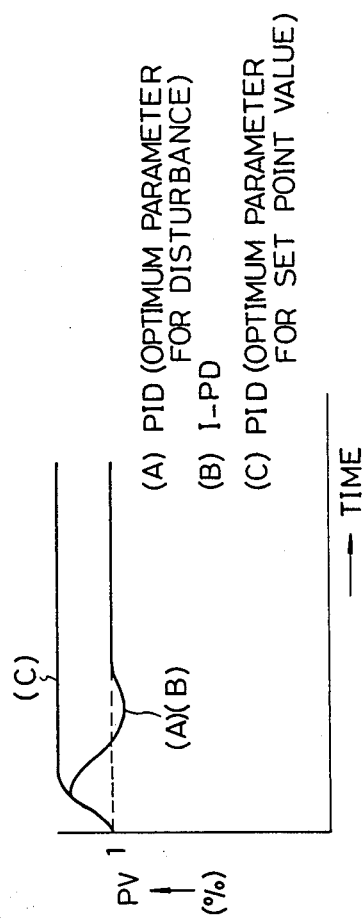
FIG. 5 shows optimum parameters for external disturbances and optimum parameters for set point value of the PID parameters.
FIG. 6 shows responses to a step external disturbance in the cases of the use of respective optimum parameters.
Figure 7:
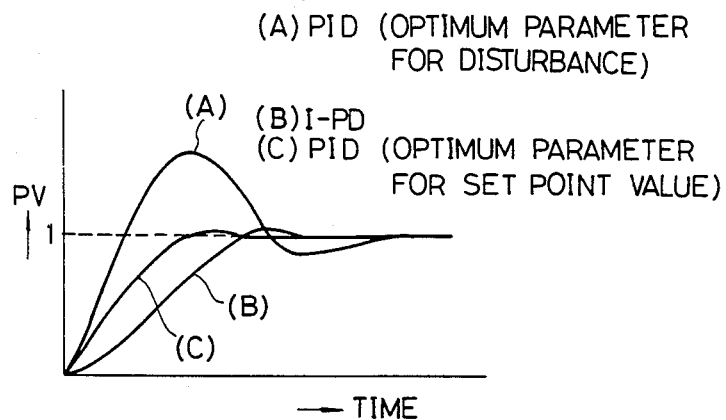
FIG. 7 shows responses to a unit step change in the set point value.

In FIG. 5 are shown the optimum parameters for disturbances (at which the controller optimally suppresses the influences due to disturbances) KP, $T_I$, and $T_D$ and the optimum parameters for set point value (at which the controller introduces the plant into the new condition swiftly) Kp*, $T_I$*, and $T_D$* of the PID parameters, namely, the proportional gain Kp, the integral time $T_I$, and the derivative time $T_D$. In addition, the responses to a step disturbance in cases where the respective optimum parameters are used are shown in FIG. 6, and the responses to a unit step change in the set point value are shown in FIG. 7.

As shown in FIG. 6, in the case of a stepped disturbance, a satisfactory response is obtained when the optimum parameters for disturbances Kp, $T_I$, and $T_D$ are set, as shown by the curve (A). However, when they are set to the optimum parameters for set point value Kp*, $T_I$*, and $T_D$*, there is generated a steady deviation, as shown by the curve (C).

In contrast, for a step change in the set point value SV, when the parameters are set to the optimum parameters for set point value. Kp*, $T_I$*, and $T_D$*, the response is satisfactory, as shown by the curve (C). However, when they are set to the optimum parameters for disturbances Kp, $T_I$, and $T_D$, an overshooting is generated and becomes oscillatory as shown by the curve (A) in FIG. 7.

Process controllers of several types to which the present invention is applied will be described next.

FEEDFORWARD COMPENSATION TYPE

In the following description the term "feedforward" is used for a configuration in which the set point value is operated and the result is fed to the controlled object, using a deviation operation unit.

Figure 8:
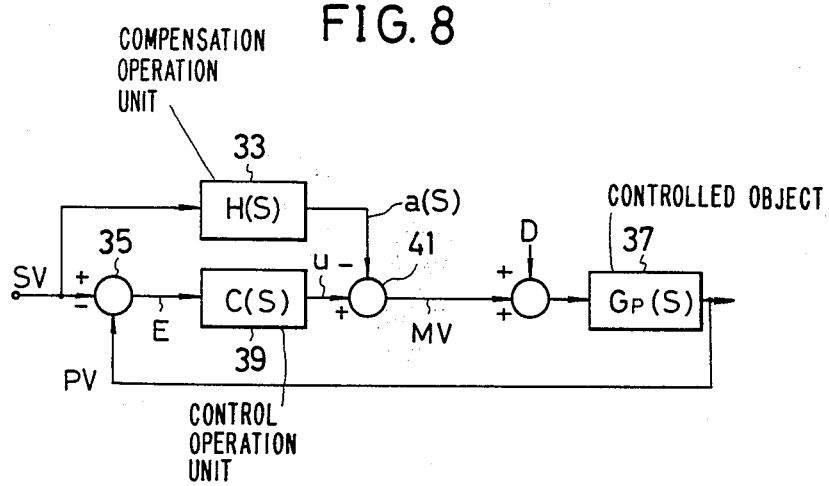
FIG. 8 is a functional block diagram for illustrating the structure of a first embodiment of the present invention.

FIG. 8 is a functional block diagram illustrating the structure of a process controller according to a first embodiment of the present invention.

In the figure, reference numeral 33 is a compensating operation unit. The set point value SV is introduced to the compensating operation unit 33 and a deviation operation unit 35, and the deviation operation unit 35 determines the deviation E between the set point value SV and the control value PV from a controlled object 37, and outputs the result to a control operation unit 39. The control operation unit 39 applies to the deviation E each operation of proportional, integral, and differentiation based on the transfer function C(s) defined by Eq. (1) to compute the adjusted output MV.

$$C(s) = K_p \left(1 + \frac{1}{T_I \cdot s} + \frac{T_D \cdot s}{1 + \gamma \cdot T_D \cdot s}\right) \quad (1)$$

Here, it is assumed that the control constants Kp, $T_I$, and $T_D$ for the transfer function are adjusted to the optimum condition for suppressing disturbances by means of CHR method shown in FIG. 2 etc., so that the variations in the control value PV due to disturbance D are suppressed by an adjusted output u to a condition with no overshoot and minimum setting time.

However, with the control constants determined by the above adjustment, when the set point value varies, the gain becomes large so that control is excessive and the control value PV overshoots the set point value to a large extent. Therefore, the compensation operation unit 33 carries out the compensating operation for the set point value SV based on the transfer function H(s) given by Eq. (2) (described below) to compute the compensating quantity a(s), in order to correct the control constants Kp, $T_I$, and $T_D$ that are adjusted to the optimum characteristics condition for suppressing disturbances so as to be equivalent to the parameters Kp*, $T_I$*, and $T_D$* for optimum characteristics condition for following the set point value, with respect to the deviation E that is generated by the variations in the set point value. The compensating quantity a(s) is output to an operation unit 41 where it is subtracted from the adjusted output u that comes from the control operation unit, the result of the subtraction is supplied to the controlled object 37 as the manipulated value MV. By virtue of this compensation, the transfer function given by Eq. (1) which is adjusted to the condition which has optimum characteristics for suppressing disturbances will be modified, by the deviation E due to variations in the set point value, to a transfer function C*(s) for the condition which has optimum characteristics for following the set point value as shown virtually by Eq. (3).

$$H(s) = K_p \left((1 - \alpha) + \frac{\beta}{1 + T_I \cdot s} + \frac{(1 - \gamma) \cdot T_D \cdot s}{1 + \eta \cdot \gamma \cdot T_D \cdot s}\right) \quad (2)$$

$$C^*(s) = K_p \left(\alpha + \left(\frac{1}{T_I \cdot s} - \frac{\beta}{1 + T_I \cdot s}\right) + \frac{\gamma \cdot T_D \cdot s}{1 + \eta + \gamma \cdot T_D s}\right) \quad (3)$$

$$= K_p^* \left(1 + \frac{1}{T_I^* \cdot s} + \frac{T_D^* \cdot s}{1 + \eta \cdot \gamma \cdot T_D^* \cdot s}\right) \quad (4)$$

where $\alpha$, $\beta$, and $\gamma$ are adjusting parameters. $\alpha$ adjusts the proportional gain Kp, $\beta$ modifies the integral time $T_I$ equivalently, and $\gamma$ modifies the derivative time $T_D$.

By constructing the controller as above, regardless of whether it is due to variations in the control value PV or to the change in the set point value, with respect to the deviation E from the deviation operation unit 35, computation is carried out by the transfer function given by Eq. (2) to the condition of optimum characteristics for suppressing the disturbances. A part of the computed result which is based on the deviation due to the change in the set point value, is corrected by the compensating quantity $a_{(s)}$ that is computed based only on the set point value, and is modified to a condition which has optimum characteristics for following the set point value by means of the transfer function defined by Eq. (3). By so doing, it becomes possible to set the control constants Kp*, $T_I$*, and $T_D$* for the optimum characteristic condition for following the set point value by correcting the parameters $\alpha$, $\beta$, and $\gamma$ that can be independently adjusted for optimization for the change in the set point value, without changing the control constants Kp, $T_I$, and $T_D$ that are adjusted to the optimum characteristic condition for suppressing disturbances.

Next, the principle of the present embodiment will be described.

The control response for the process shown in FIG. 8 can be represented by the following equation.

$$PV = \frac{\{C(s) - H(s)\} \cdot G_p(s)}{1 + C(s) \cdot G_p(s)} \times SV + \frac{G_p(s)}{1 + C(s) \cdot G_p(s)} \times D \quad (5)$$

According to Eq. (5), in order to manipulate solely the response to the set point value SV without changing the response to the disturbance D when the set point value SV is changed, one needs only to change the factor {C(s)−H(s)}. If {C(s)−H(s)} is the transfer function C*(s) for the optimum characteristics condition for following the set point value, it becomes necessary to arrange for the transfer function C*(s) such that it is possible to change independently the values for the control constants Kp, $T_I$, and $T_D$ of the transfer function, in order to optimize the characteristics for following the response due to the change in the set point value, based solely on the change in the set point value SV, without changing the values of the control constants that are adjusted to the optimum condition for suppressing the disturbance.

Morever, in order for the control response to the set point value SV to bc settled, it is necessary according to a final value theorem, that when the set point value SV is changed stepwise by a fixed value a, with a fixed value of the disturbance D, the deviation $E_{sv}=a$ has to be zero in a steady state.

As a function that satisfies the above two conditions there defined by a transfer function C*(s) that is given by Eq. (3).

Namely, with respect to the former condition, the adjusting parameters $\alpha$, $\beta$, and $\gamma$ are included in the function to change the values of each of the control constants Kp, $T_I$, and $T_D$ only for the set point value SV without affecting the control value PV. In order to realize such a function C*(s), the present embodiment provides a configuration in which the compensation operation unit 33 supplies the compensating quantity a(s) to the output of the control operation unit 39, and its transfer function H(s) is given by Eq. (2).

The transfer function H(s) is defined by the equation that follows, and the compensating quantity a(s) is calculated with respect to the set point value SV performing each of the proportional, integral, and differential operations based on the set values of the adjusting parameters $\alpha$, $\beta$, and $\gamma$.

$$H(s) = C(s) - C^*(s) \quad (6)$$

The set point values for the adjusting parameters $\alpha$, $\beta$, and $\gamma$ of the function are determined as follows by substituting into Eq. (4) the transfer function $C^*(s)$ given by Eq. (3) by using the control constants $Kp^*$, $T_I^*$, and $T_D^*$ in the optimum characteristic condition for following the set point value. Here, $Kp^*$, $T_I^*$, and $T_D^*$ are values that can be determined by CHR method shown in FIG. 2 or the like.

First, $\alpha$ can be determined by $$Kp^* = \alpha \cdot Kp \therefore \alpha = Kp^*/Kp \quad (7)$$

As to the parameter $\beta$, in relation to the final value theorem that will be described shortly, it can be determined by setting $$\left( \frac{1}{T_I \cdot s} - \frac{\beta}{1 + T_I \cdot s} \right) \approx \frac{\beta}{T_I \cdot s} \quad (8)$$

Then, $\beta_o$ can be determined from $$\frac{Kp x}{T_I \cdot s} = \frac{Kp^*}{T_I^* \cdot s} \therefore \beta = \alpha \times \frac{T_I}{T_I^*} \quad (9)$$

Further, $\gamma$ can be determined as follows.

$$K_P^* T_D^* = \gamma K_P \cdot T_D \therefore \gamma = \frac{K_P^* T_D^*}{K_P T_D} = \gamma \frac{T_D^*}{T_D} \quad (10)$$

Next, the second condition satisfying the final value theorem will be explained.

In order for the steady deviation $E_{SV} = a$ to be zero, it is necessary to form the following equation.

$$\lim_{s \to 0} \frac{\{C(s) - H(s)\} G_P(s)}{1 + C(s) \cdot G_P(s)} = 1 \quad (11)$$

$$\lim_{s \to 0} \frac{K_P \left( \alpha + \left( \frac{1}{T_I \cdot s} - \frac{\beta}{1 + T_I \cdot s} \right) + \frac{\gamma \cdot T_D \cdot s}{1 + \eta \cdot \gamma \cdot T_D \cdot s} \right) G_P(s)}{1 + K_P \left( 1 + \frac{1}{T_I \cdot s} + \frac{\gamma \cdot T_D \cdot s}{1 + \eta \cdot \gamma \cdot T_D \cdot s} \right) G_P(s)} = 1 \quad (12)$$

In order to satisfy Eq. (11), the integration term becomes important. This is because, for $s \to 0$ it follows $$\lim_{s \to 0} \frac{1}{T_I \cdot s} \to \infty$$

so that Eq. (11) will not be valid unless the denominator and the numerator of Eq. (11) have equal value. Because of this, the integral time $T_I$ cannot be changed by simply multiplying it by parameter $\alpha$ or $\gamma$ thereby varying the integral time equivalently by using a first order lag closest to the integral operation, as shown by Eq. (9).

With such a configuration, there are provided identical integration terms in the denominator and the numerator, and the integral time in the numerator is adjusted by the first order lag, thereby satisfying the final value theorem.

Next, description will be made whether it is possible to change equivalently, by the use of a first order lag, the integral time which is difficult to compensate for in conventional controllers.

According to Eqs. (1) and (3), the integration term for the disturbance is $1/(T_I \cdot s)$, and the integraterm for the change in the set point value is $$\left( \frac{1}{T_I \cdot s} - \frac{\beta}{1 + T_I \cdot s} \right).$$

Figure 9:
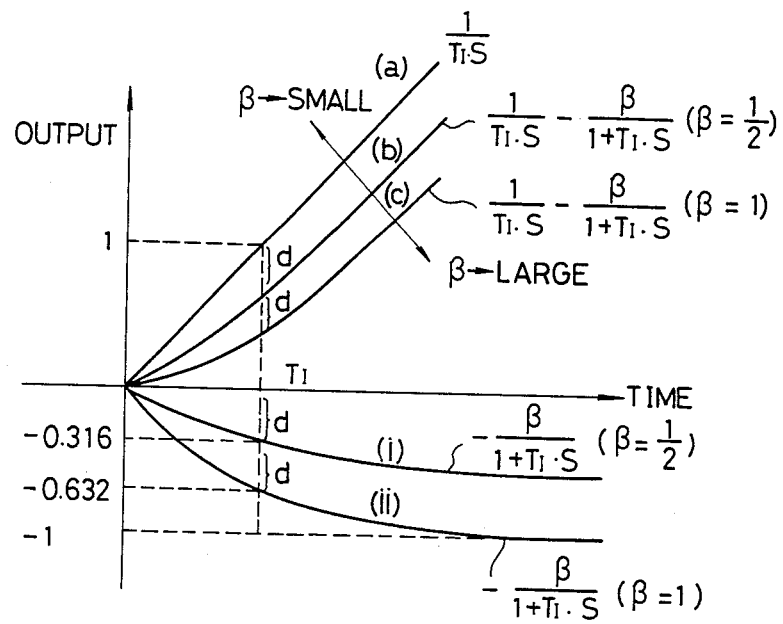
FIG. 9 shows equivalent change of integration time by varying the adjusting parameter for the change in the set point value.

By comparing the two integration terms, it is possible by varying the adjusting parameter $\beta$ to change equivalently only the integral time for the change in the set point value as shown in FIG. 9, with the integration term for disturbance being fixed.

In FIG. 9, curve (a) is the curve for the integration term $1/(T_I \cdot s)$' curve (b) is the curve in which a first order lag $$\frac{\beta}{1 + T_I \cdot s} \left( \text{when } \beta = \frac{1}{2} \right)$$

is subtracted from the curve (a), curve (c) is the curve in which a first order $$lag \frac{\beta}{1 + T_I \cdot s} \text{ (when } \beta = 1)$$

is subtracted from curve (a). Curves (b) and (c) are the results of equivalently modifying the integral time of curve (a) by the first order lag, so that it can be approximated by $\beta/(T_I \cdot s)$ as in Eq. (8), and the optimum value for $\beta$ is $2 \times \beta$ by an actual simulation. Since the output of the first order lag is determined by the value of $\beta$, the integral time $T_I$ increases in the order of (a), (b), and (c) as the value of $\beta$ increases. Moreover, the period during which the integral time need be changed in the actual control is on the order of the time for the process to respond (the integral time $T_I$ for the integration operation ), during which the integration is approximated nearly linearly. In FIG. 9 the subtraction component due to the first order lag of each response is shown with reference to curves (i), (ii). As seen in the above, with the curve (a) as a reference, the integral time $T_I$ can be increased by increaasing $\beta$ in the positive direction and the integral time can be decreased by increasing $\beta$ in the negative direction.

As easily understood, according to the embodiment of the invention an integration operation with a relatively long integral time is carried out during a certain period after a change in the set point value while the set point value is integrated during a short integral time.

Next, the operation of the present embodiment, and the method for adjusting each of the control constants and the adjusting parameters will be described in detail.

As an adjusting method, there are (1) a method in which the process characteristics (time constant T, dead time L, and gain K of the process) are determined first and are adjusted based on these values by the CHR method or other method and (2) a method by which the control constants are adjusted to have the step response to the set point value equal to a desired response, under the conditions of incompletely known process characteristics.

According to method (1), the control constants Kp, $T_I$, $T_D$, Kp*, $T_I$*, and $T_D$* can be calculated for both the optimum characteristic condition for suppressing the disturbance and the optimum characteristic condition for following the set point value, so that the adjusting parameters $\alpha$, $\beta$, and $\gamma$ can be computed by substituting them into Eqs. (7), (9), and (10).

Figure 10:
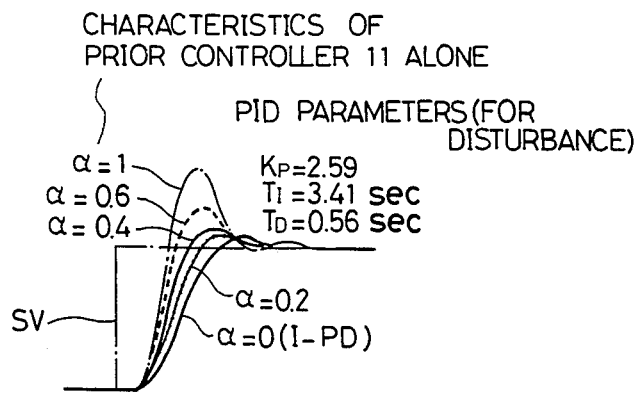
FIG. 10 is an explanatory graph showing how the characteristics of the system are adjusted by varying the parameter according to the invention.
Figure 11:
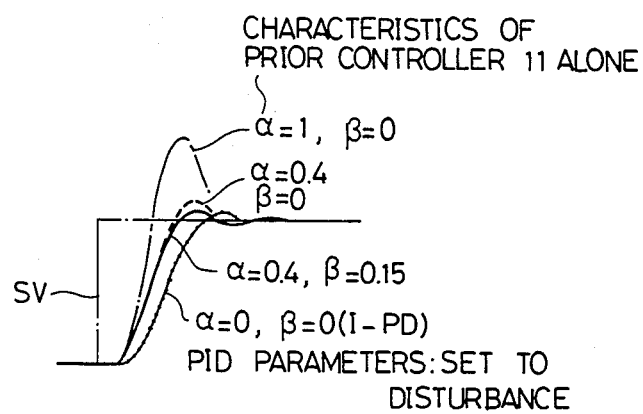
FIG. 11 is an explanatory graph showing how the characteristics of the system are adjusted by varying the parameter according to the invention.

Further, in method (2) which is used in many cases, first the control constants Kp, $T_I$, and $T_D$ for the control operation unit 39 are adjusted to make the response to the control value PV equal to the optimum characteristic condition for suppressing the disturbance by changing the set point value SV stepwise. Then, the adjusting parameters are corrected to lead to a response which corresponds to the desired optimum characteristic condition for following the set point value. For example, if simulation is made with $\gamma=0$ (in the case of the proportional and integral compensation operations) for the transfer function $$GP(s) = \frac{1}{1 + 5s} e^{-2L}$$

for the controlled object 37, the response changes as shown by FIGS. 10 and 11 depending upon the values of the parameters $\alpha$ and $\beta$.

Moreover, the present embodiment has a configuration by which the response can be adjusted by the parameters so that various forms of control can be obtained by varying the value of the parameter $\alpha$. Thus, in FIG. 10 if $\alpha=0$, it becomes the I-PD control, and if $\alpha=1$, then it leads only to the control of the characteristic condition for suppressing the disturbance which is similar to the convention controllers. Here, the parameter $\alpha$ adjusts the proportional gain Kp of the control constants, and the characteristics in rise and the overshoot condition of the response can be selected by varying the parameter $\alpha$ in the range of $0 \leq \alpha \leq =1$. In addition, $\beta$ is the parameter for changing the integral time $T_I$, and it can improve the overshooting of the response without affecting the rising of the response curve, as shown in FIG. 11. An actual simulation revealed that the optimum characteristics are obtained for $\alpha=0.4$ and $\beta=0.15$. Further, $\gamma$ is the parameter for changing the derivative time $T_D$ by which it is possible to change the rising characteristics of the response curve.

Once the control constants Kp, $T_I$, and $T_D$ and the adjusting parameters $\alpha$, $\beta$, and $\gamma$ are set as in the above, when a disturbance D is applied to the controlled object 37, the variation in the control value PV due to the disturbance D is supplied to the control operation unit 39 as a deviation from the set point value SV. Then, the adjusting output u is computer based on the control constants for the optimum characteristic condition for suppressing the disturbance, and the result is output to the operation unit 41 shown in FIG. 8. In the operation unit 41, the compensating quantity a(s) from the compensation operation unit 33 does not change since there is no change in the set point value SV, and the variation due to the disturbance D is quickly suppressed by outputting the manipulated value MV to the controlled object 37.

When the set point value SV is further changed, the control operation unit 39 carries out an operation under the condition of suppressing the disturbance, even for the deviation E that corresponds to the additional change. However, with respect to the portion of change in the set point value SV, the compensating quantity a(s) which is computed in the compensation operation unit 33 based on the adjusting parameters is subtracted in the operation unit 41 and the result is output to the controlled object 37, giving rise to a compensation that responds optimally to the set point value SV.

As in the above, according to the present invention it is possible to (1) correct virtually the control constants that are adjusted to the condition to suppress the disturbance, to a condition that follows the set point value, so that it is possible to realize both characteristics of disturbance suppression and set point value following. Further, it is possible (2) to adjust independently the constants for the condition of disturbance suppression and for the condition of set point value following, so that it is possible to select the optimum condition freely for both of the constants. Moreover, (3) since the adjusting parameters can be selected after adjusting the control constants to optimize the response of the control value PV to the set point value SV, adjustment on the spot becomes possible to that extent, which leads to the reliability, ease, and quickness of the adjustment. Still further, (4) the construction of the controller is realized by just adding the function of the compensation operation unit 33 to the control operation unit 39 so that it is easily applicable to an existing controller. Finally, (5) since it can compensate for the integral time $T_I$, though equivalently, which has so far been thought impossible, it is possible to improve the controllability for, especially, the integration process (astatic process). This is because, in contrast to the finiteness of the integral time for the optimum characteristic condition for suppressing the disturbance, the integral time for the optimum characteristic condition for following the set point value has to be made infinite, so that it is necessary to provide a configuration which makes it possible to change the integral time in order to obtain the optimum controllability for both conditions. Further, in the CHR method shown in FIG. 2, the integral time alone is determined by different parameters, namely, by the dead time L of the controlled object with respect to suppression of the disturbance, and by the time constant T of the controlled object with respect to the set point value, so that the compensation is absolutely necessary for improving the controllability.

In the foregoing description of the embodiment of the invention, explanation has been made by assuming that the control operation unit 39 carries out each of the proportional, integral, and differential operations, and the compensation operation unit 33 carries out the corresponding proportional, integral, and differential operations. However, in the present invention, the control operation unit 11, has a construction which carries out at least the integral operation, is performed to improve the controllability. In other words the invention resides in the adjustment of the integral times for both the set point value following characteristics and the disturbance suppression characteristics. The compensation operation unit 10 has a construction in which the equivalent integral compensation operation due to a lag element is performed alone or selectively combined with integration and proportional or differentiation operations, depending upon the desired following response to the set point value. For instance, if control of overshooting alone is what is needed, the compensation operation can be composed of integration alone, or may be composed by combining it with proportional or differential operations, or both proportional and differential operations, depending upon the degree of improvement of the rising characteristics of the response.

Moreover, in the above description of the embodiment, use was made of imperfect differentiation which is in frequent use in general as the differential operation for the control operation unit 39. However, needless to say, similar effects can be obtained by the use of the perfect differentiation. In other words, differentiation is meant to include both of the perfect and imperfect differentiations.

SET POINT VALUE COMPENSATION

The present invention can be also applied to a process control system in which the set point value is operated, in the pre-stage of a deviation operation unit, by a compensation unit which brings no influence to the characteristics for suppressing the disturbances acting on the system.

Referring to FIGS. 12 through 22, second to sixth embodiments of the present invention will be described. Here, components identical to those in the first embodiment are identified by identical symbols to omit further explanation.

The present embodiment has a compensation operation unit 47 in the pre-stage of the deviation operation unit 35 for the set point value SV. In the first embodiment, in the control operation unit 39 for a change in the set point value, the control constants $K_p$, $T_I$, and $T_D$ that are adjusted to the optimum condition for suppressing the disturbance are virtually compensated to those for the optimum condition for following the set point value such that the compensating quantity a(s) from the compensation operation unit 33 is added to the output of the control operation unit 39 under the condition for suppressing the disturbance, together with the deviation due to the change in the set point value. In contrast, in the present embodiment, the compensation operation unit 47 performs a compensation operation for a change in the set point value SV that changes the predetermined control constants for suppressing the disturbance of the control operation unit to the compensating quantity that corrects virtually to the control constants for the condition for following the set point value. The result of the compensation operation is supplied to the deviation operation unit 35.

Figure 12:
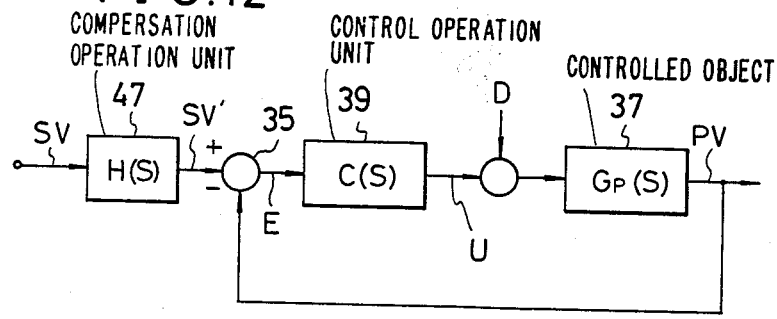
FIG. 12 is a functional block diagram for illustrating the structure of a second embodiment of the present invention.

Namely, the control response of the present embodiment shown in FIG. 12 is represented by the following equation.

$$PV = \frac{H(s) \cdot C(s) \cdot G_P(s)}{1 + C(s) \cdot G_P(s)} \times SV + \quad (13)$$

$$\frac{G_P(s)}{1 + C(s) \cdot G_P(s)} \times D$$

From Eq. (13) it will be seen that in order to manipulate the response to the set point value SV without changing the response to the disturbance, it is only necessary to change the transfer function H(s)·C(s).

FIG. 13 shows the transfer functions of second to fourth embodiments of the present invention in which lead/lag operation means are utilized as the compensation operation unit 47. This figure also shows the overall adjusting modes corresponding to each embodiment.

In this connection the expression for an overall adjusting mode will be explained. There are four distinct symbols of which the expression is composed, namely, P, I, D and hyphen. Expressions without a hyphen correspond to systems of one degree of freedom type. For example, PI mode expresses a system controlled in terms of a proportion rate and an integral time for both the set point value following characteristics and the suppression of disturbances acting on the system. With one hyphen, adjusting modes having different control modes for the two characteristics can be expressed. Symbols preceding a hyphen refers to the adjusting mode of the both characteristics while symbols following the hyphen expresses only the characteristics for suppressing the disturbance. For example, I-P represents an adjusting mode in which an integration time can be adjusted for both the characteristics while only the disturbance suppression characteristics undergoes a proportional operation. If preceding and following symbols have the same symbol, the expression denotes a two degrees of freedom type system. In case three sets of symbols are connected to each other by two hyphens, the preceding mode represents that for the set point value following characteristics, the last mode represents that for the disturbance suppression characteristics and the middle mode therebetween represents both. For example, P-I-P expresses an adjusting mode in which the proportional rate adjustment is of two degrees of freedom and the integration operation with one degree of freedom is carried out for the both characteristics.

(1.1) Setting No. 1.1 Standard PI Control

When a=1 ... then H(s)=1, which is the prior standard PI control.

(1.2) Setting No. 1.2 P-I Control

When $\alpha=0$ .... Then $$H(s) = \frac{1}{1 + T_I \cdot s}$$

which is the PID control with a filter for the set point value. In this case, the PI parameters for PI control are set to the optimum PI parameters for disturbance suppression, and the time constant for the lead/lag operation means 41 is set to the integral time $T_I$. These settings become optimum for both variations in disturbances and changes in the set point value, obtaining a two degrees of freedom PI control system.

For changes in the control value PV, there is obtained $$K_P\left(1 + \frac{1}{T_I \cdot s}\right),$$

which represents a PI operation.

For changes in the set point value (SV), there is obtained $$H(s) \times C(s) \quad (14)$$

$$= \frac{1}{1 + T_I \cdot s} \times K_P\left(1 + \frac{1}{T_I \cdot s}\right)$$

$$= \frac{1}{1 + T_I \cdot s} \times K_P \times \frac{1 + T_I \cdot s}{T_I \cdot s}$$

$$= \frac{K_P}{T_I \cdot s}$$

Which represents the so-called I-P control system.

(1.3) Setting No. 1.3 P-I-P Control

When $0 < \alpha < 1 \ldots$ there is obtained $$H(s) = \frac{1 + \alpha \cdot T_I \cdot s}{1 + T_I \cdot s}$$

which represents from an overall viewpoint a P-I-P control as the following proof indicates. This means that I (integration) operates simultaneously on the set point value and the control value, and P (proportional) can be independently set with respect to the values for the changes in the set point value and the values for the changes in the central value.

For changes in the control value PV, it leads to $$KP \left( 1 + \frac{1}{T_I \cdot s} \right)$$

which represents a PI operation.

For changes in the set point value (SV) it leads to $$H(s) \times C(s) \quad (15)$$

$$= \frac{1 + \alpha \cdot T_I \cdot s}{1 + T_I \cdot s} \times K_P \times \left( 1 + \frac{1}{T_I \cdot s} \right)$$

$$= \frac{1 + \alpha \cdot T_I \cdot s}{1 + T_I \cdot s} \times K_P \times \frac{1 + T_I \cdot s}{T_I \cdot s}$$

$$= K_P \times \frac{1 + \alpha \cdot T_I \cdot s}{T_I \cdot s}$$

$$= K_P \times \left( \alpha + \frac{1}{T_I \cdot s} \right)$$

Compared with Eq. (14), the above expression has an additional proportional term $Kp \times \alpha$ for the changes in the set point value SV, so that the characteristics for following the changes in the set point value can be improved by varying the value of $\alpha$, without changing the characteristics for the disturbances.

FIG. 14(A) shows the output of the lead/lag operation means 47 for different values of $\alpha$, namely, for $\alpha = 0$, $\alpha = 1$, and $0 < \alpha < 1$, when there is a step-like change in the set point value SV. On the other hand, FIG. 14(B) shows the changes in the control value PV corresponding to the above cases. The transfer function in the lead/lag operation means 47 is given by $$H(s) = \frac{1 + \alpha T_I \cdot S + \delta T_I \cdot T_D \cdot S^2}{1 + T_I \cdot S + T_I \cdot T_D \cdot S^2}$$

(2.1) Setting No. 2.1 Standard PID Control

When $\alpha = 1$ and $\delta = 1$, it leads to $H(s) = 1$, which corresponds to the standard PID control of the prior art.

(2.2) Setting No. 2.2 I-PD Control

When $\alpha = 0$ and $\delta = 0$, there is obtained $$H(s) = \frac{1}{1 + T_I \cdot s + T_I \cdot T_D \cdot s^2}$$

which corresponds to the PID control with filter for the set point value. In this case, the PID parameters for the PID control are set to be the optimum parameters for suppressing disturbance, and the parameters for the lead/lag operation means 47 are set also to be the same PID parameters. These settings become optimum for the variations in the disturbances and also for the change in the set point value, realizing a two degree of freedom PID control system.

For variations in the control value (PV), it leads to $$Kp \left( 1 + \frac{1}{T_I \cdot s} + T_D \cdot s \right)$$

which corresponds to the PID operation.

For changes in the set point value (SV), it leads to $$H(s) \times C(s) \quad (16)$$

$$= \frac{1}{1 + T_I \cdot s + T_I \cdot T_D \cdot s^2} \times Kp \left( 1 + \frac{1}{T_I \cdot s} + T_D \cdot s \right)$$

$$= \frac{1}{1 + T_I \cdot s + T_I \cdot T_D \cdot s^2} \times Kp \frac{1 + T_I \cdot s + T_I \cdot T_D \cdot s^2}{T_I \cdot s}$$

$$= \frac{Kp}{T_I \cdot s}$$

which corresponds to the so-called I-PD control system.

(2.3) Setting No. 2.3 P-PI-PD Control

When $0 < \alpha < 1$ and $\delta = 0$, there is obtained $$H(s) = \frac{1 + \alpha \cdot T_I \cdot s}{1 + T_I \cdot s + T_I \cdot T_D \cdot s^2}$$

This corresponds overall to the P-I-PD control as the following proof indicates. This means that I (integration) operates commonly with respect to the set point value and the control value, P (proportional) is operated to set the variations in the set point value independently of the variations in the control value, and D (differentiation) is operated with respect to the control value only.

For changes in the control value, it leads to $$Kp \left( 1 + \frac{1}{T_I \cdot s} + T_D \cdot s \right)$$

which corresponds to the PID operation.

For changes in the set point value, it leads to $$H(s) \times C(s) \quad (17)$$

$$= \frac{1 + \alpha \cdot T_I \cdot s}{1 + T_I \cdot s + T_I \cdot T_D \cdot s^2} \times Kp \left( 1 + \frac{1}{T_I \cdot s} + T_D \cdot s \right)$$

$$= \frac{1 + \alpha \cdot T_I \cdot s}{1 + T_I \cdot s + T_I \cdot T_D \cdot s^2} \times Kp \times \frac{1 + T_I \cdot s + T_I \cdot T_D \cdot s^2}{T_I \cdot s}$$

$$= Kp \left( \frac{1 + \alpha \cdot T_I \cdot s}{T_I \cdot s} \right)$$

$$= Kp \left( \alpha + \frac{1}{T_I \cdot s} \right)$$

Compared with Eq. (16), there is an additional proportional term $K_p \times \alpha$ for variations in the set point value so that it is possible to improve the characteristics for following the variations in the set point value by varying the value of $\alpha$, without changing the characteristics for suppressing the disturbances. In other words, it corresponds to the P-I-PD control system.

(2.4) Setting No. 2.4 D-I-PD Control

When $\alpha=0$ and $0<\delta<1$, there is obtained $$H(s) = \frac{1 + \delta \cdot T_I \cdot T_D \cdot s^2}{1 + T_I \cdot s + T_I \cdot T_D \cdot s^2},$$

This corresponds overall to the D-I-PD control system as the following proof indicates. In other words, for changes in the control value, it gives $$K_p \left( 1 + \frac{1}{T_I \cdot s} + T_D \cdot s \right)$$

which corresponds to the PID operation.

For the set point value, it leads to $$H(s) \times C(s) \tag{18}$$

$$= \frac{1 + \delta \cdot T_I \cdot T_D \cdot s^2}{1 + T_I \cdot s + T_I \cdot T_D \cdot s^2} \times K_p \left( 1 + \frac{1}{T_I \cdot s} + T_D \cdot s \right)$$

$$= \frac{1 + \delta \cdot T_I \cdot T_D \cdot s^2}{1 + T_I \cdot s + T_I \cdot T_D \cdot s^2} \times K_p \times \frac{1 + T_I \cdot s + T_I \cdot T_D \cdot s^2}{T_I \cdot s}$$

$$= K_p \frac{1 + \delta \cdot T_I \cdot T_D \cdot s^2}{T_I \cdot s}$$

$$= K_p \left( \frac{1}{T_I \cdot s} + \delta \cdot T_D \cdot s \right)$$

This corresponds to the ID operation for changes in the set point value.

Therefore, summarizing the above results, it corresponds overall to the D-I-PD control system.

(2.5) Setting No. 2.5 PD-I-PD Control

When $0<\alpha<1$ and $0<\delta<1$, there is obtained $$H(s) = \frac{1 + \alpha \cdot T_I \cdot s + \delta \cdot T_I \cdot T_D \cdot s^2}{1 + T_I \cdot s + T_I \cdot T_D \cdot s^2},$$

which corresponds overall to the PD-I-PD control system as the following proof shows.

In other words, for changes in the control value, it leads to $$K_p \left( 1 + \frac{1}{T_I \cdot s} + T_D \cdot s \right)$$

which corresponds to the PID operation.

For changes in the set point value, it leads to $$= \frac{1 + \cdot T_I \cdot s + \gamma \cdot T_I \cdot T_D \cdot s^2}{1 + T_I \cdot s + T_I \cdot T_D \cdot s^2} \times$$

$$K_p \left( 1 + \frac{1}{T_I \cdot s} + T_D \cdot s \right)$$

$$= \frac{1 + \cdot T_I \cdot s + \gamma \cdot T_I \cdot T_D \cdot s^2}{1 + T_I \cdot s + T_I \cdot T_D \cdot s^2} \times K_p \times$$

$$\frac{1 + T_I \cdot s + T_I \cdot T_D \cdot s^2}{T_I \cdot s}$$

$$= K_p \times \frac{1 + \alpha \cdot T_I \cdot s + \gamma \cdot T_I \cdot T_D \cdot s^2}{T_I \cdot s}$$

$$= K_p \left( \alpha + \frac{1}{T_I \cdot s} + \gamma \cdot T_D \cdot s \right),$$

which means that it corresponds to the PID operation for changes in the set point value.

Therefore, summarizing above it corresponds to the PD-I-PD control system.

(3.1) Setting No. 3.1 PID control with differentiation for PV

FIG. 15 shows a fourth embodiment of the present invention. In this embodiment, the lead/lag operation means 47 comprises two elements 47A and 47B that are connected in succession.

In this case, the transfer function for the lead/lag operation means and others are shown in FIG. 13. In the table of FIG. 13, $H_1 = \gamma \cdot T_D$ $H_2 = \delta \cdot \gamma T_D = \delta \cdot H_1$, ($\delta = 0.1 - 0.3$)

Here, $\delta \approx 0.1$ in the case of analog adjustors, but $\delta = 0.3$ in the case of a digital operation.

(Case of setting to $\alpha=1$ and $\gamma=0$)

When $\alpha=1$ and $\gamma=0$, the transfer function for the lead/lag element becomes $H(s)=1$, which corresponds to the PID control with differentiation for PV of the prior art.

(3.2) Setting No. 3.2 I-PD control (Case of setting $\alpha=\gamma=0$)

When $\alpha=\gamma=0$, the transfer function for the lead/lag element becomes $$H(s) = \frac{1}{1 + T_I \cdot s}$$

This shows that the filter for the set point value becomes the PID control with differentiation for PV, but it can be shown by the following proof that it corresponds to the I-PD control.

For changes in the control value (PV), $$K_p \left( 1 + \frac{1}{T_I \cdot s} + T_D \cdot s \right)$$

which corresponds to the PID operation.

For changes in the set point value (SV), it leads to $$H(s) \times C(s) \tag{19}$$

$$= \frac{1}{1 + T_I \cdot s} \times \frac{K_P(1 + T_I \cdot s)}{T_I \cdot s}$$

$$= \frac{K_P}{T_I \cdot s}$$

which corresponds to the I operation.

Therefore, it corresponds overall to the so-called I-PD control.

(3.3) Setting No. 3.3 P-I-PD control (Case of setting $0 < \alpha < 1$ and $\gamma = 0$)

When $0 < \alpha < 1$ and $\gamma = 0$, the transfer function for the lead/lag element is given by $$H(s) = \frac{1 + \alpha \cdot T_I \cdot s}{1 + T_I^s}$$

which corresponds overall to the P-I PD control as the following proof shows.

For changes in the control value (PV), it leads to $$K_P\left(1 + \frac{1}{T_I \cdot s} + T_D \cdot s\right)$$

which corresponds to the PID operation.

For changes in the set point value (SV), it leads to $$H(s) \times C(s) \quad (20)$$

$$= \frac{1 + \alpha \cdot T_I \cdot s}{1 + T_I \cdot s} \times K_p\left(1 + \frac{1}{T_I \cdot s}\right)$$

$$= \frac{1 + \alpha \cdot T_I \cdot s}{1 + T_I \cdot s} \times K_p \times \frac{1 + T_I \times s}{T_I \cdot s}$$

$$= K_P \times \frac{1 + \alpha \cdot T_I \cdot s}{1 + T_I \cdot s}$$

$$= K_P\left(\alpha + \frac{1}{T_I \cdot s}\right)$$

which corresponds to the PI operation.

Therefore, overall it corresponds to the P-I-PD control.

(3.4) Setting No. 3.4 D-I-PD Control (Case of setting $\alpha = 0$ and $0 < \gamma < 2$)

When $\alpha = 0$ and $0 < \gamma < 2$, the transfer function for the lead/lag element is given by $$H(s) = \frac{1}{1 + T_I \cdot s} \times \frac{1 + H_1 \cdot s}{1 + H_2 \cdot s}$$

which corresponds to the D-I-PD control as the following proof shows.

For changes in the control value (PV), it leads to $$K_p\left(1 + \frac{1}{T_I \cdot s} + T_D \cdot s\right)$$

which corresponds to the PID operation.

For changes in the set point value (SV), it leads to $$H(s) \times C(s) \quad (21)$$

$$= \frac{1}{1 + T_I \cdot s} \times \frac{1 + H_1 \cdot s}{1 + H_2 \cdot s} \times K_P\left(1 + \frac{1}{T_I \cdot s}\right)$$

$$= \frac{1}{1 + T_I \cdot s} \times \frac{1 + H_1 \cdot s}{1 + H_2 \cdot s} \times K_P \times \frac{1 + T_I \cdot s}{T_I \cdot s}$$

$$= K_P \times \frac{1}{T_I \cdot s} \times \frac{1 + H_1 \cdot s}{1 + H_2 \cdot s}$$

$$= K_P\left(\frac{1}{T_I \cdot s}\right) \times \left(\frac{1 + \gamma \cdot T_D \cdot s}{1 + \gamma \cdot \delta \cdot T_D \cdot s}\right)$$

which corresponds to the ID operation.

Therefore, overall it corresponds to the D-I-PD control.

(3.5) No. 3.5 PD-I-PD Control (Case of setting $0 < \alpha < 1$ and $0 < \gamma < 2$)

When $0 < \alpha < 1$ and $0 < \gamma < 1$, the transfer function for the lead/lag element becomes $$H(s) = \frac{1 + \alpha \cdot T_I \cdot s}{1 + T_I \cdot s} \times \frac{1 + H_1 \cdot s}{1 + H_2 \cdot s}$$

which corresponds to the PD-I-PD control by the following proof.

For changes in the control value (PV), it leads to $$K_p\left(1 + \frac{1}{T_I \cdot s} + T_D \cdot s\right)$$

which corresponds to the PID operation.

For changes in the set point value (SV), it leads to $$H(s) \times C(s) \quad (22)$$

$$= \frac{1 + \alpha \cdot T_I \cdot s}{1 + T_I \cdot s} \times \frac{1 + H_1 \cdot s}{1 + H_2 \cdot s} \times K_p\left(1 + \frac{1}{T_I \cdot s}\right)$$

$$= \frac{1 + \alpha \cdot T_I \cdot s}{1 + T_I \cdot s} \times \frac{1 + H_1 \cdot s}{1 + H_2 \cdot s} \times K_p \times \frac{1 + T_I \cdot s}{T_I \cdot s}$$

$$= K_p \times \frac{1 + \alpha \cdot T_I \cdot s}{T_I \cdot s} \times \frac{1 + H_1 \cdot s}{1 + H_2 \cdot s}$$

$$= K_p\left(\alpha + \frac{1}{T_I \cdot s}\right) \times \left(\frac{1 + \gamma \cdot T_D \cdot s}{1 + \gamma \cdot \delta \cdot T_D \cdot s}\right)$$

which corresponds to the interference-type PID operation.

Therefore, it corresponds overall to the PD-I-PD control.

(3.6) Setting No. 3.6 Standard PID (Case of setting $\alpha = 1$ and $\gamma = 1$)

When $\alpha = 1$ and $\gamma = 1$, the transfer function for the lead/lag element becomes $$H(s) = \frac{1 + H_1 \cdot s}{1 + H_2 \cdot s}$$

which corresponds to the standard PID control as the following proof shows.

For changes in the control value (PV), it leads to $$K_P\left(1 + \frac{1}{T_I \cdot s} + T_D \cdot s\right)$$

which corresponds to the PID operation.

For changes in the set point value (SV), it leads to $$H(s) \times C(s) \quad (23)$$

$$= \frac{1 + H_1 \cdot s}{1 + H_2 \cdot s} \times K_P\left(1 + \frac{1}{T_I \cdot s}\right)$$

$$= K_P\left(1 + \frac{1}{T_I \cdot s}\right) \times \left(\frac{1 + T_D \cdot s}{1 + \delta \cdot T_D \cdot s}\right)$$

which corresponds to the interference-type PID operation.

Therefore, overall it corresponds to the standard PID control.

(4) PID-PI Control

It is possible to determine the transfer functions of the system in FIG. 12 in order to establish a standard PID control system for system transfer function as established in the first embodiment.

A description of a fifth embodiment will now be made by using a transfer function for the control operation unit 39 which can carry out both proportional and integration operations as shown by Eq. (24). As in the foregoing embodiments, the control operation may be combined with proportional or differential operations in any desired way if it also includes at least an integral operation.

$$H(s) = \frac{C^*(s)}{c(s)} \frac{K_P\left(\alpha + \left(\frac{1}{T_I \cdot s} - \frac{\beta}{1 + T_I \cdot s}\right) + \frac{\gamma \cdot T_D \cdot s}{1 + \eta \cdot \gamma \cdot T_D \cdot s}\right)G_P(s)}{K_P\left(1 + \frac{1}{T_I \cdot s}\right)} \quad (24)$$

$$= \frac{1 + \alpha \cdot T_I \cdot s}{1 + T_I \cdot s} + \quad (25)$$

$$\left(\frac{-\beta}{1 + T_I \cdot s} + \frac{\gamma \cdot T_D \cdot s}{1 + \eta \cdot \gamma \cdot T_D \cdot s}\right)\left(\frac{T_I \cdot s}{1 + T_I \cdot s}\right)$$

Figure 17:
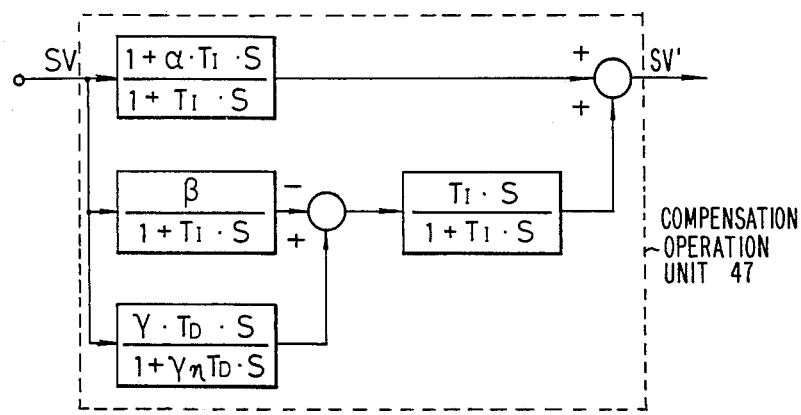
FIG. 17 is a block diagram showing another configuration of the compensatory operation unit.

In Eq. (25), $$\frac{1 + \alpha \cdot T_I \cdot s}{1 + T_I \cdot s}$$

is a proportional gain compensation component for lead/lag element, $$\left(\frac{-\beta}{1 + T_I \cdot s}\right)\left(\frac{T_I \cdot s}{1 + T_I \cdot s}\right)$$

is a compensation component for the equivalent integral time due to the first order lag element, and $$\left(\frac{\gamma \cdot T_D \cdot s}{1 + \eta \cdot \gamma \cdot T_D \cdot s}\right)\left(\frac{T_I \cdot s}{1 + T_I \cdot s}\right)$$

is a compensation component for the differential time. A functional block diagram for these elements is shown by FIG. 17.

Figure 18A:
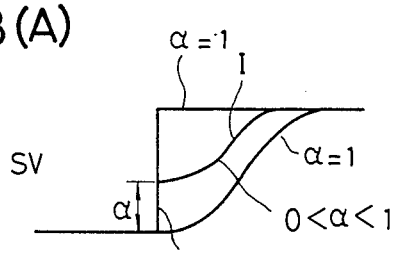
FIGS. 18(A) and 18(B) show the responses to the control value PV.

The proportional gain compensation component, as shown by FIG. 18(A), can compensate a step-like change in the set point value SV as a combination of a gain corresponding to the value of $\alpha$ due to the lead element and a first order lag function due to the lag element. With respect to FIG. 18(A), the optimum following characteristics with respect to the set point value SV are that the response is fast and there is less overshoot. The overshooting amount depends on the amount integrated during the time while the control value PV follows the change in the set point value SV. The deviation between the set point value SV and the control value PV is obtained through the lag element, thereby reducing the integrated amount based on the deviation. However, the lag element cannot give a sufficiently fast rise response to the control value PV and the rise response to the control value PV is thereby delayed. Therefore, the rise response is adjusted and increased by the lead element by $\alpha T_I S$, thereby obtaining an allowable rise response to the control value PV in the overshoot. The response to the control value PV is as shown by FIG. 18(B).

Figure 18B:
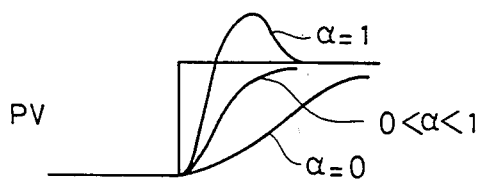

According to the response given by FIG. 18(B), when $\alpha = 0$, namely, when the change in the set point value SV consists only of a first order function, no overshoot is generated but there is a lag in rise time. When $\alpha \geq 1$, the control value PV is overshoot markedly because the change in the set point value is multiplied by 2 times and is output to the control operation unit 39 of FIGS. 8 and 12. In such a circumstance, the response to the control value PV is adjusted to the optimum condition by varying the value of $\alpha$, so that $\alpha$ can be determined similarly to the case of Eq. (7). Further, the lead/lag operation for the proportional gain compensation can adopt various configurations, for instance, the form of a second order transfer function or the like.

Further, with respect to the compensational component for the integral time, as explained in conjunction with FIG. 9, it is constructed in the present embodiment, so as to change the integral time equivalently by the lag element, in order to satisfy the final value theorem. The adjusting parameter $\beta$ is determined similarly to Eq. (9).

Figure 19A:
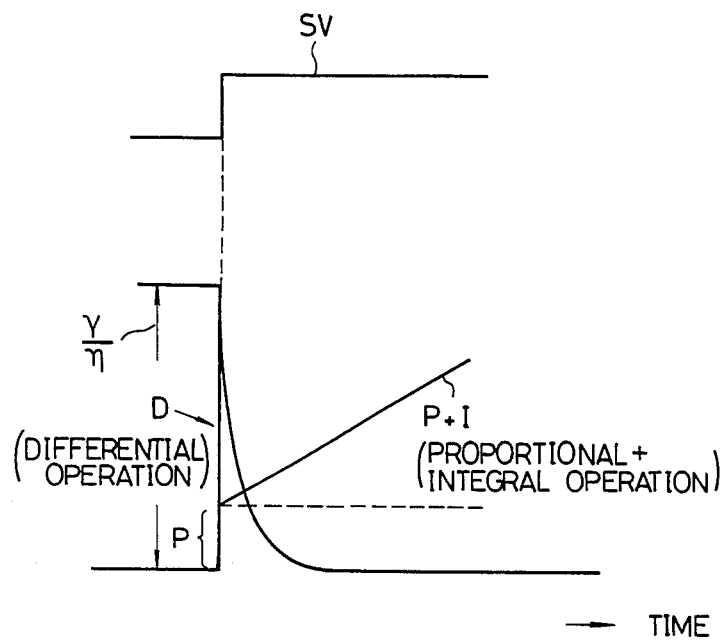
FIG. 19(A) is an explanatory graph showing how the characteristics of the system are adjusted by varying the parameter according to the invention.
Figure 19B:
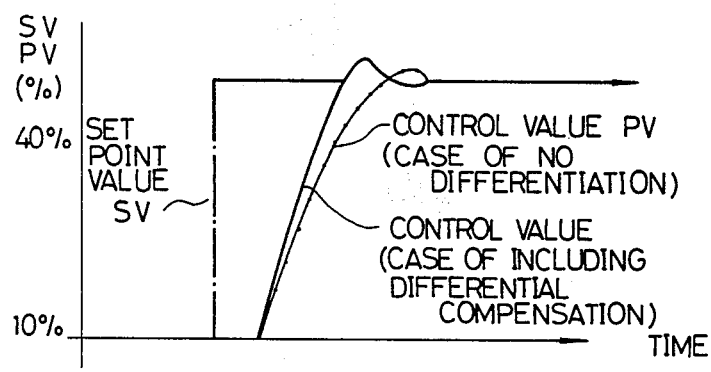
FIG. 19(B) is an explanatory graph showing how the characteristic of the system are adjusted by varying the parameter according to the invention.

Moreover, the compensational component for the derivative time changes the amount of imperfect differentiation corresponding to the change in the set point value SV, by means of the adjusting parameter $\gamma$ as shown by FIG. 19(A). As shown in FIG. 19(B), the response to the control value PV does not affect overshoot, thereby improving rise time characteristics.

Since the adjusting method for the control constants and the adjusting parameters are similar to those in the foregoing embodiments, further explanation will be omitted. The compensation operation unit 47 of FIG. 17 corresponds to the compensation operation unit of FIG. 12.

First, when a disturbance D is impressed on the controlled object 37 (see FIG. 12), the control operation unit 39 carries out proportional, integral, and differential operations based on the control constants Kp, $T_I$, and $T_D$, that are set to a characteristic condition, in order to quickly suppress the change in the control valve PV. The resultant output is supplied to the controlled object 37 as the manipulated value MV. When there is a change in the set point value SV in this state, the value SV is corrected in the unit 47, by the proportional, integral, and differential compensation operations, to a change value SV' which virtually corrects the control constants Kp, $T_I$, and $T_D$ in the control operation unit 39 to the optimum characteristic condition for following the set point values Kp*, $T_I$*, and $T_D$*. The change value SV' is compared with the control value PV in the deviation operation unit 35, and a deviation signal E is supplied to the control operation unit 39. In the control operation unit 39, the deviation signal E is used to give an optimum characteristic condition for suppressing the disturbance. Since, however, compensation is given in advance with respect to the changed amount in the set point value, a manipulated value u is output to the controlled object 37 as a value yielding the optimum characteristic condition for following the set point value. In this way, the controlled object 37 responds optimally to both the disturbance D and the set point value SV.

In the above embodiment, similar to the foregoing embodiments, description was made assuming that all of the proportional, integral, and differential operations are performed in both of the control operation unit 39 and the compensation operation unit 47. However, if the control operation unit 39 includes the integral operation and the compensation operation unit 47 has a construction that can carry out the corresponding compensating operation, for example, a construction shown by FIG. 20 (according to which the integral compensation alone can be realized), the rest can be selectively combined depending upon the desired process response.

Figures 20, 21, 22, 23:
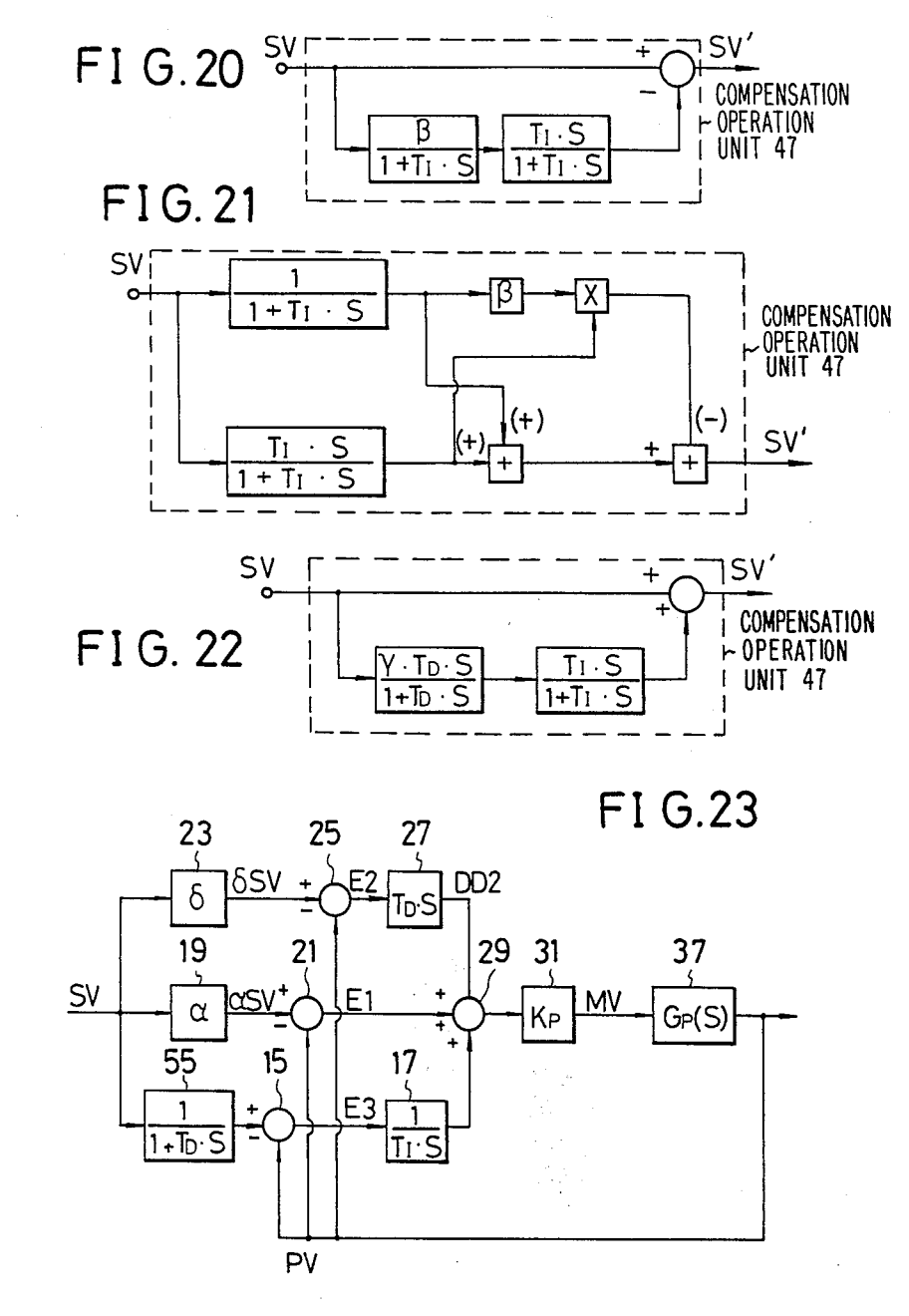

Moreover, when the block construction shown in FIG. 17 is simplified to achieve the functions shown in FIG. 12, it may be organized as shown by FIG. 21.

Still further, when the differential compensation operation alone is to be carried out in the compensation operation unit 47, $\alpha$ and $\beta$ in Eq. (40) need only be set to zero so that the configuration in FIG. 22 can be used. In this case, the differentiation includes both the perfect and imperfect differentiations as before.

Referring to FIG. 23, a sixth embodiment of the invention is shown having a controller of a separated operation type.

As shown in the figure, the controller has special features that differ from the PID controller as shown in FIG. 4 in that it is provided with a first order lag filter in the integral control element.

In this embodiment, the set point value SV is input in parallel to a first coefficient unit 19, a second coefficient unit 23, and a first order lag filter 55. In the first coefficient unit 19, the set point value SV is multiplied by a coefficient $\alpha$, and a deviation signal $E_1$ is computed at a first subtractor 21 between the output $\alpha$ SV and a measured value PV detected at a controlled object 37. In the second coefficient unit 23, the set point value SV is multiplied by a coefficient $\delta$, the output $\delta$ SV is input to a second subtractor 25, a deviation signal $E_2$ between the output $\delta$ SV and the control value PV is computed, and the deviation signal $E_2$ undergoes a differential operation with respect to a derivative time $T_D$ in a differential operation unit 27. The first order lag filter 55 outputs the set point value SV at a time delay corresponding to its change in value, and the output is input to a third subtractor 15 in which a deviation $E_3$ between this output and the control value PV is computed, and the deviation $E_3$ undergoes an integral operation with respect to an integral time $T_I$ in an integral operation unit 17.

Then, the deviation $E_1$, a differentiated value $DD_2$ of the deviation $E_2$ obtained by the differential operation unit 27, and an integrated value $ID_3$ of the deviation $E_3$ obtained by the integral operation unit 17 are input to an adder 29. The output of the adder 29 is input to a proportional unit 31 where it is multiplied by a proportional gain Kp, and the result is fed to the controlled object 37 as a manipulated signal MV. By the above arrangement, control is carried out to equalize the control value PV and the set point value SV.

The above configuration is arranged to be able to optimize simultaneously both "set point value following" and "disturbance suppression", by setting the PID parameters Kp, $T_I$, and $T_D$, coefficients $\alpha$ and $\delta$, and the time constant $T_o$ of the first order lag filter 55 as follows.

First, (I) each of the PID parameters Kp, $T_I$, and $T_D$ are set to the optimum parameters for disturbance.

The controller works in identical manner as the standard PID controller with respect to the process value PV. Therefore, by the above setting of parameters, there will be obtained for the process value PV an operation in accordance with the optimum parameters for disturbance Kp, $T_I$ and $T_D$ so that the response to the disturbances will be satisfactory.

Next, (II) the coefficients $\alpha$ and $\delta$ are set as follows based on the optimum proportional gain for disturbance, the optimum derviative time for disturbance $T_D$, the optimum proportional gain for set point value Kp*, the optimum derivative time for set point value $T_D$*, among the optimum parameters for disturbance and for set point value of the standard PID controller.

$$\alpha = Kp^*/Kp, \tag{26}$$

$$\gamma = \alpha \times T_D^*/T_D. \tag{27}$$

In the controller 1, the actual proportional gain is $\alpha \times Kp$ and the actual derivative time is $\gamma \times Kp \times T_D$, for the set point value SV due to the action of the coefficients $\alpha$ and $\gamma$. Therefore, by setting the coefficients $\alpha$ and $\gamma$ as shown above, the actual proportional gain and the actual derivative time for the set point value SV become Kp* and Kp*$\times T_D$*, respectively, since Kp and $T_D$ have already been set to the optimum values for disturbance. Namely, for the set point value SV, proportional and differential operations are obtained which are the same as setting the standard PID controller to the optimum parameters for set point value Kp*, $T_I$*, and $T_D$*.

Next, (III) by adjusting the time constant $T_o$, the actual integral time for the set point value SV is set to be equal to the integral time $T_I$*/Kp* that is obtained when the standard PID controller is set to the optimum parameters for set point value Kp*, $T_I$*, and $T_D$*.

The adjustment of the time constant $T_o$ may be done as follows.

Figure 24:
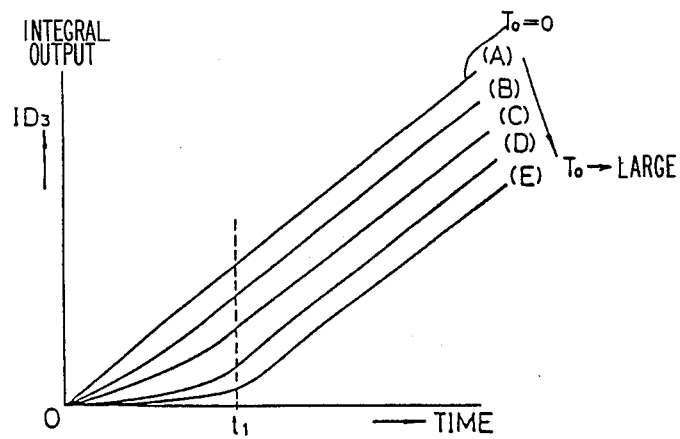
FIG. 24 shows the response characteristics of the output for a unit step input of the transfer function.

In step (I), the integral time $T_I$ for the integral operation unit 17 is set to the optimum integral time $T_{or}$ for disturbance. Therefore, a transfer function $G_i(s)$ for integral operation for the set point value SV becomes $1/(T_{or}\cdot s\cdot(1+T_0\cdot s))$ The response characteristics of the output ID3 for a unit step input of the transfer function $G_i(s)$ are shown in FIG. 24. In this figure, curve (A) shows the characteristics when $T_o = 0$, i.e., when there is not first order lag filter 55. As the time constant $T_o$ increases, the output time lag increases as shown in curves (B), (C), (D) and (E).

Here, for changes in input, the controller is used in general in a region of small value of time, for example, in the region of time which is less than the time $T_1$ of the FIG. 24. Therefore, an increase in the time constant $T_o$ corresponds to a decrease in the slope or rise of the curve, which is roughly equivalent to an increase in the integral time $T_I$ for the set point value SV. Therefore, one need only to increase the time constant $T_o$ gradually from "0" and set it to a value for which the actual integral time for the set point value SV is equivalent to the case of setting the proportional gain Kp to the optimum proportional gain Kp* for set point value and the integral time $T_I$ to the optimum integral time $T_I^*$ for set point value.

By setting the coefficients $\alpha$ and $\delta$ and the time constant $T_o$ as in the steps (II) and (III), control operation is obtained which follows the optimum parameters for set point value Kp*, $T_I^*$, and $T_D^*$, so that a response is obtained that is satisfactory in following the set point value.

In what follows there will be described an operating procedure of an operator and a setting method of the parameters for steps (I), (II), and (III), by the use of the astatic process model.

(I) First, the operator changes the set point value stepwise by a predetermined amount prior to varying the coefficients $\alpha$ and $\delta$ for optimizing the set point value, in order to set the PID parameters Kp, $T_I$, and $T_D$ to the optimum parameters for disturbance. Then, this change generates a variation in the control value PV similar to a variation due to a disturbance, and the optimum parameters for disturbance are adjusted to optimize these variations. An example of such operation is shown in FIG. 5 with Kp=0.188, $T_I$=14.6 (min.), and $T_D$=1.98 (min.).

(II) Once the parameters for disturbance are set in step (I), the operator sets next the coefficients $\alpha$ and $\delta$ in order to optimize the variation due to the set point value.

Namely, it will be seen from FIG. 5 that the optimum proportional gain for disturbance Kp, the optimum proportional gain for set point value Kp*, the optimum derivative time for disturbance $T_D$ and the optimum derivative time for set point value $T_D^*$ are given respectively by the following.

Kp=0.118, Kp*=0.126, $T_D$=1.98 (min.), $T_D^*$=2.04 (min.).

By substituting the above values into Eqs. (26) and (27) the coefficients are set as $\alpha = Kp^*/Kp = 0.126/0.188 = 0.67$, $\delta = \times T_D^*/T_D = 0.67 \times 2.04/1.98 = 0.69$ (III) Next, the time constant $T_o$ is set as follows.

Namely, since the integral time $T_I$ is already set to the optimum integral time for disturbance $T_I$=14.6 (min.), the time constant $T_o$ needs only be set for the set point value SV as if it is set to the optimum integral time for set point value of $T_I^* = \infty$. For instance, the choice of $T_o = T_I = 14.6$ (min.) is sufficient for practical purposes.

Through the setting in each of the steps (I), (II), and (III) a response is obtained to step disturbance similar to the case where the standard PID controller is set to the optimum parameters for disturbance Kp, $T_I$, and $T_D$ as shown by the curve (A) of FIG. 6, and a response to unit step change is obtained in the set point value SV similar to the case where the standard PID controller is set to the optimum parameters for set point value Kp*, $T_I^*$, and $T_D^*$ as shown by the curve (C) of FIG. 7. In other words, the process can be optimized for both "disturbance suppression" and "set point value following."

Figure 25:
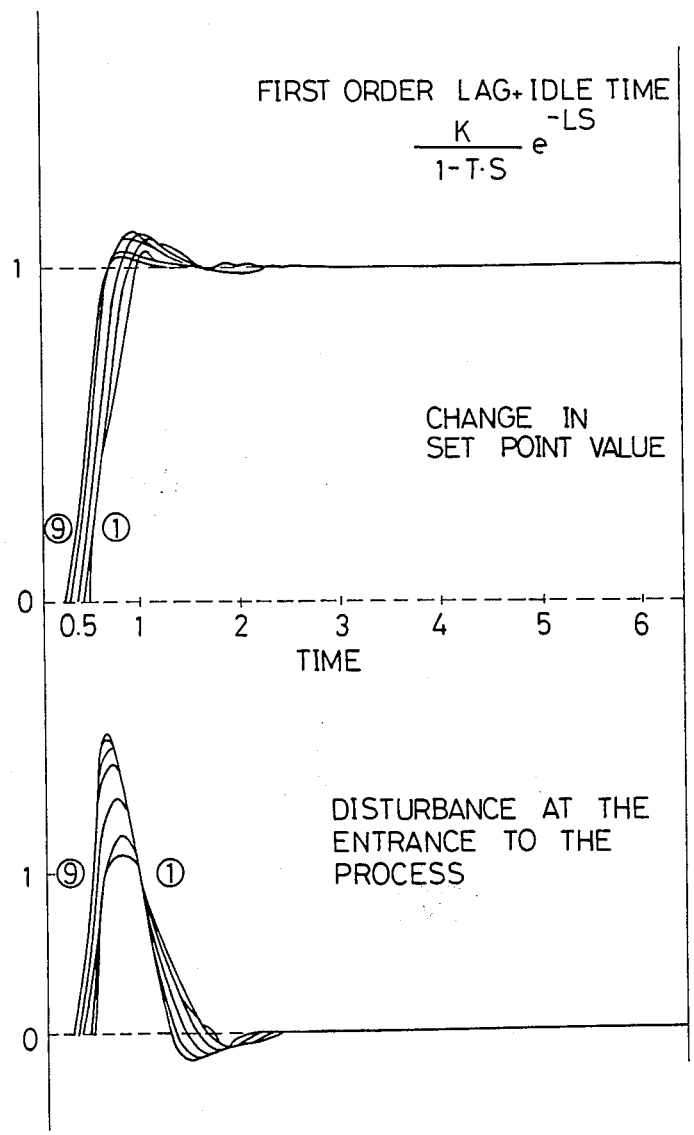
FIG. 25 shows responses for a unit step in the case when the process is constructed by elements of first order lag and idle time.

As a result, the response to a unit step in the case when the process is constructed, for example, by an element "first order lag+dead time" is as shown in FIG. 25. Namely, the controllability against variations in disturbance is satisfactory without generating offset even when the time constant $T_o$ is increased, while the controllability for variations in set point value has a high degree of following with little overshoot.

In addition, in this controller there is no need for a complicated processing which determines the control parameters by simultaneously considering the responsiveness of the controller to the disturbances and the variations in the set point value, in order to optimize the response to the disturbances and to the variations in the set point value. That is, the adjustment is extremely easy requiring a simple setting process as shown by the steps (I) through (III) separately and independently for each control loop, and it is sufficient to only adjust the controller at a console by an operator.

It should be noted that the optimization of an astatic process explained in the above is the most difficult, but the optimization will further be facilitated if it is a "first order lag+dead time" process $(e^{-L}S/(1+T_1\cdot S))$ or a "second order lag+dead time" process $(e^{-L}S/(1+T_1\cdot S)/(1+T_2\cdot S))$, since the optimum integral time $T_I^*$ for the set point value never becomes infinite.

Furthermore, it should be recognized that the various control systems in the past can be selected by setting the coefficients $\alpha$ and $\delta$ to "1" or "0". For example, if the time constant chosen is $T_o=0$, the following results will be obtained.

(I) When $\alpha = \delta = 1$

This corresponds to removing the first and the second coefficient units 3 and 5, which is equivalent to the standard PID controller.

(II) When $\alpha = 1$ and $\delta = 0$

This corresponds to applying the differentiation action to the control value PV alone, which is equivalent to the PID controller with PV differentiation.

(III) When $\alpha = 0$ and $\delta = 0$

This corresponds to applying the proportional and differential actions to the process value PV alone, which is equivalent to the I-PD controller.

As in the above, the process controller in accordance with this embodiment eliminates the problems associated with invention systems, and at the same time, possesses a high degree of controllability and can be widely used with the possibility of freely selecting various kinds of prior control systems.

Consequently, by applying the controller to a plant, it becomes possible to optimize each control of the plant for both disturbances and changes in the set point value.

Therefore, it is possible to respond more effectively to the severe requirements in recent years that are mentioned earlier, with an extremely significant contribution to the industry.

It is to be noted in the above embodiment that description was made in conjunction with the perfect differentiation ($T_D \cdot s$). However, for practical purposes, an imperfect differentiation ($T_D/(1+\gamma \cdot T_D \cdot s)$), $\delta = 0.2 - 0.3$ is used.

Figure 26:
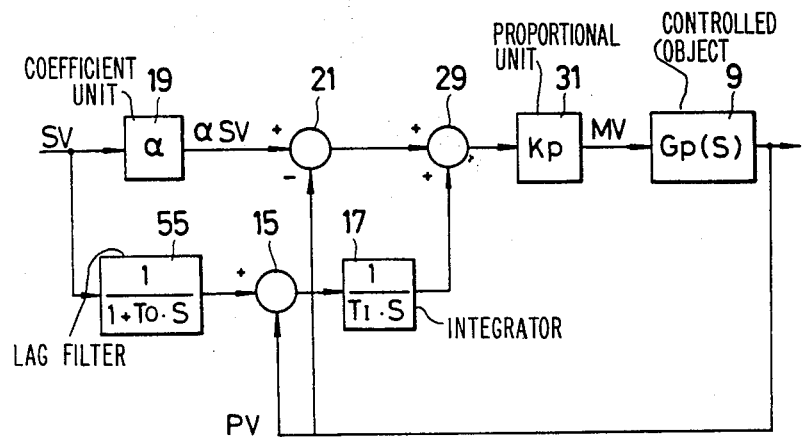
FIG. 26 is a functional block diagram for illustrating the structure of a seventh embodiment of the present invention.

FIG. 26 shows a block diagram for a controller according to a seventh embodiment of the present invention.

As shown in the figure, the controller corresponds to the former embodiment from which are omitted the second coefficient unit 23 concerned with differentiation action and the second subtractor 25 and the differential operation unit 27, and is applied to the case in which the PI control is sufficient for some processes.

In this embodiment, it is also possible to optimize simultaneously both "set point value following" and "disturbance suppression" within the range of the PI control similar to the case of the foregoing embodiments.

Moreover, the following can be considered as modifications to the embodiments.

(I) The first order lag filter 55 may be modified as follows.

$$1/(1+T_0 \cdot s) = 1 - T_0 \cdot s/(1+T_0 \cdot s) \quad (30)$$

Figure 27:
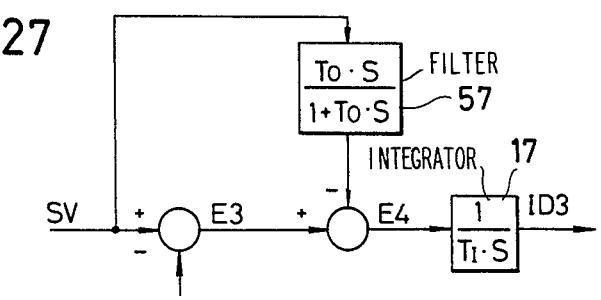
FIG. 27 is a block diagram showing an equivalent integral action part of the seventh embodiment.

Therefore, it will also be equivalent to arranging the integral action part, as shown in FIG. 27, to compute the deviation $E_4$ between the set point value SV and the control value PV, to compute the deviation $E_3$ between the deviation $E_4$ and the value of the set point value SV obtained through a filter 57 that corresponds to the second term in the above expression, and to add the deviation $E_3$ to an integrator 17.

(II) In order to be able to carry out adjustment for the actual proportional gain independently of the differential and integral actions, there may be added a new coefficient unit at a position between the first subtractor 21 and the adder 29 or the proportional unit 31 may be shifted to this position.

(III) New coefficient units may be inserted respectively in the inputting routes of the control value PV to the first, second, and third subtractors 21, 25, and 15, respectively, thereby facilitating the optimal adjustment.

Figure 28:
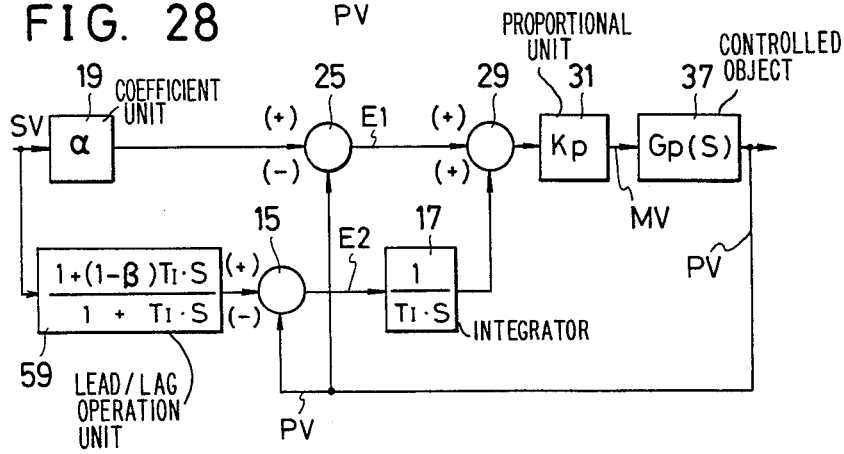
FIG. 28 is a functional block diagram for illustrating the structure of an eighth embodiment of the present invention.

FIG. 28 is a functional block diagram for illustrating the construction of an eighth embodiment of the device in accordance with the present invention.

In this embodiment, in place of the unit 55 in FIG. 26 an operational expression for the lead/lag operation unit 59 is given by the following equation.

$$\frac{1 + (1 - \beta) \cdot T_I \cdot s}{1 + T_I \cdot s}, \quad (28)$$

As may be seen from the figure, an operational adjustment is performed according to $$K_P \left( 1 + \frac{1}{T_I \cdot s} \right) \quad (29)$$

for a change in the control value PV, and according to $$K_P \left[ + \frac{1 + (1 - \beta) T_I \cdot s}{1 + T_I \cdot s} \cdot \frac{1}{T_I \cdot s} \right] \quad (30)$$

for a change in the set point value. Here, the proportional gain Kp and the integral time $T_I$ are set to the optimum parameters for suppressing disturbance.

In Eq. (30), for a change in the set point value SV, the integral time alone can be equivalently changed by varying the coefficient $\alpha$ and the coefficient $\beta$ in the lead/lag operation unit 59 for the set point value, with the integration term for disturbance fixed at a constant value.

If the integration term in Eq. (30) is rearranged, there is obtained the following result.

$$\frac{1 + (1 - \beta) \cdot T_I \cdot s}{1 + T_I \cdot s} \cdot \frac{1}{T_I \cdot s} = \quad (31)$$

$$\frac{(1 + T_I \cdot s) - \beta \cdot T_I \cdot s}{1 + T_I \cdot s} \times \frac{1}{T_I \cdot s} =$$

$$\left( 1 - \frac{\beta \cdot T_I \cdot s}{1 + T_I \cdot s} \right) \cdot \frac{1}{T_I \cdot s} = \frac{1}{T_I \cdot s} - \frac{\beta}{1 + T_I \cdot s}$$

In the above equation (31), the first term on the right-hand side is an integration term with integral time $T_I$ and the second term is an integrated adjustment term due to the lead/lag operation unit 59. Therefore, it is possible to vary the integral time $T_e$ (equivalent integral time) for a change in the set point value by varying the coefficient $\beta$ in the integrated adjustment term of Eq. (31).

When $\beta = 0$ in Eq. (31), it corresponds to the case where there is no adjustment for the integral time, and equivalent integral time $T_e$ equals integral time $T_I$.

Moreover, when $\beta > 0$, equivalent integral time $T_e$ is greater than integral time $T_I$.

Furthermore, when $\beta < 0$, it is easy to understand that equivalent integral time $T_e$ is less than integral time $T_I$. Therefore, once the optimum integral time for suppressing disturbance $T_I$ is determined, the equivalent integral time $T_e$ can be varied easily by varying the coefficient $\beta$.

Figure 29:
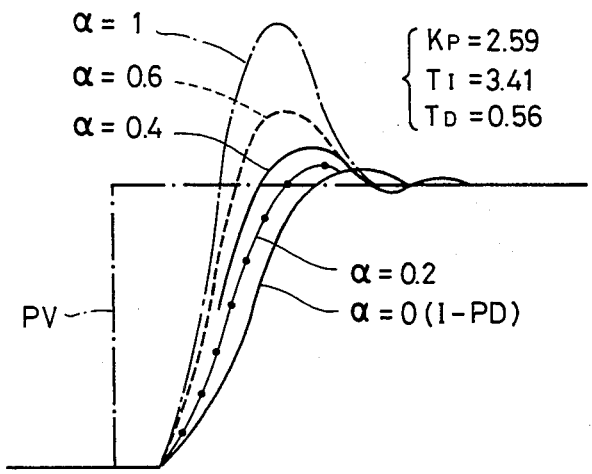
FIGS. 29 and 30 are explanatory graphs showing the characteristics of the seventh embodiment.
Figure 30:
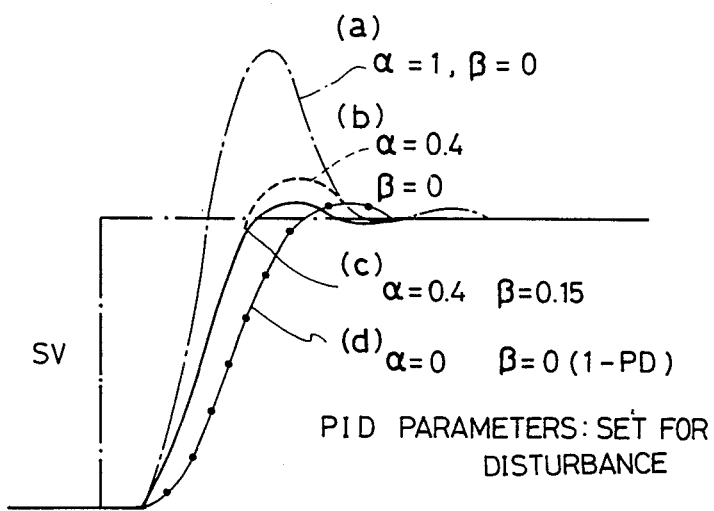

Then, the coefficients $\alpha$ and $\beta$ are corrected to bring the response to the optimum characteristic condition for following the set point value. For instance, when a simulation is carried out by using a transfer function $$G_p(s) = \frac{1}{1 + 5s} e^{-2L}$$

for a control object 37, the response varies as shown in FIGS. 29 and 30 according to the values of the coefficients $\alpha$ and $\beta$.

Changes in the coefficient $\alpha$ which adjusts the proportional gain Kp among the control constants, permits one to select the characteristics of the rise of the response curve and the state of overshooting of the curve, as shown in FIG. 29, by changing in the range $0 \leq \alpha \leq 1$. Further, the coefficient $\beta$ changes the integral time $T_I$, and by varying its value it is possible to improve the overshoot of the response curve as shown in FIG. 30, without affecting the rise in the response curve. Actual simulation revealed that optimum characteristic's are obtainable for α=0.4 and β=0.15.

Figure 31:
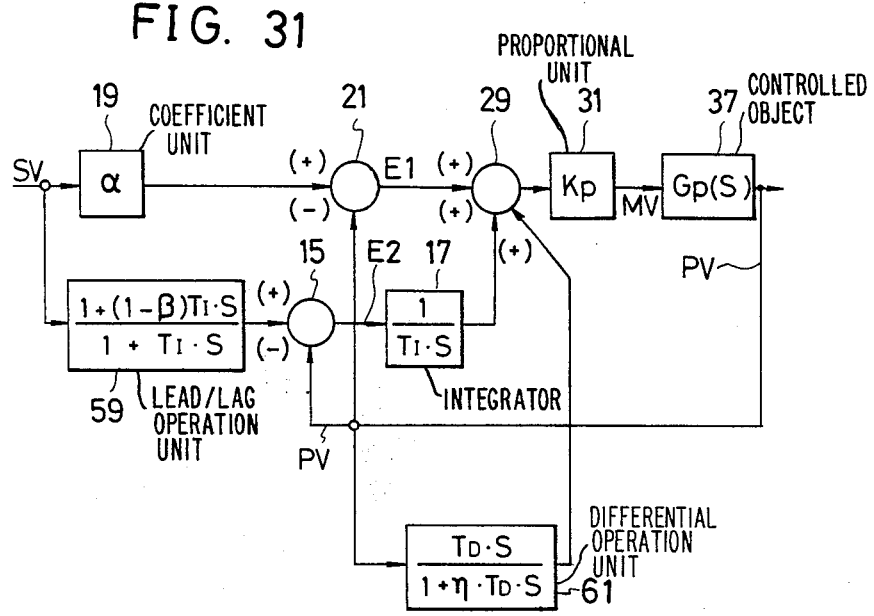
FIG. 31 is a functional block diagram for illustrating the structure of an eighth embodiment of the present invention.
Figure 32:
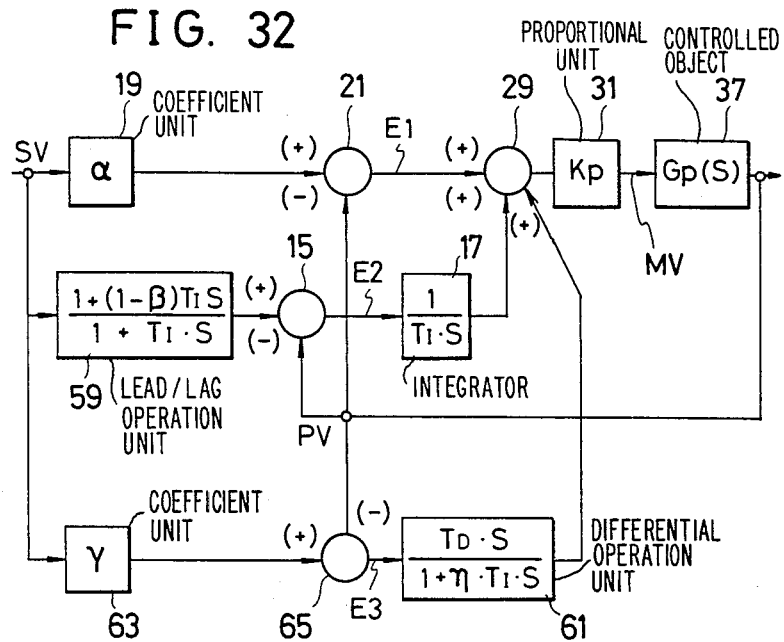
FIG. 32 is a functional block diagram for illustrating the structure of a ninth embodiment of the present invention.

FIG. 31 shows an eighth embodiment of the device in accordance with the present invention, and FIG. 32 shows a ninth embodiment of the device in accordance with the present invention.

Here, components that are identical to those for the embodiment shown in FIG. 28 are assigned identical symbols to omit further explanation.

The embodiment shown in FIG. 31 is the so-called PID controller with differentiation on PV. In a differential operation unit 61, a differential operation is applied to the control value PV, and its output signal is additively synthesized in an adder 29 together with the deviations $E_1$ and $E_2$. The other components are similar to the embodiment shown in FIG. 28.

Further, the embodiment shown in FIG. 32 shows the PID controller of an imperfect differential operation type. The set point value SV is multiplied by a coefficient γ in a coefficient unit 63, and a deviation $E_3$ (=γ SV−PV) is obtained in a substractor 65 by subtracting the control value PV from the output signal γ SV of the coefficient unit 63. The deviation $E_3$ is differentiated in a differential operation unit 61, and its output signal is additively synthesized in the adder 29 together with the deviations $E_1$ and $E_2$.

Since an integral adjustment due to the lead/lag operation unit 59 is also carried out in the embodiments shown in FIG. 31 and 32, it is possible to change the integral time easily by varying the coefficient β.

Figure 33:
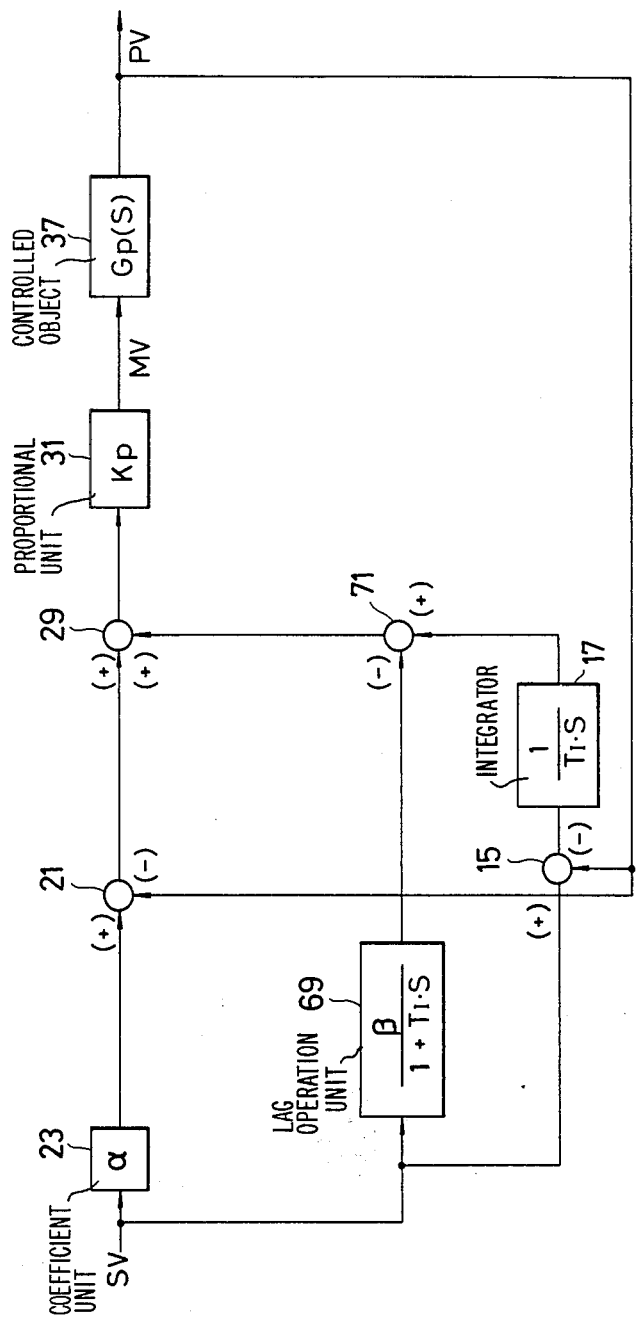
FIG. 33 is a functional block diagram for illustrating the structure of a tenth embodiment of the present invention.

FIG. 33 shows a tenth embodiment of the process controller in accordance with the present invention. Here, the components that are identical to those for the embodiment shown in FIG. 28 are given identical symbols to omit further explanation.

In this process controller, a set point value SV is input to both the coefficient unit 23 and a lag operation unit 69, and is input to the integral operation unit 17 after the control value PV is subtracted from it in the subtractor 15. The output signal that is computed for the lag in the lag operation unit 69 and the output signal which is integrally operated in the integral operation unit 17 are subtractively processed in a subtractor 71, and the result is output to the adder 29.

To be more concrete, the lag operation unit 69 is set to a first order lag represented by $\beta/(1+T_I \cdot s)$ so that the output signal from the subtractor 71 to the adder 29 has an expression shown below.

$$\left( \frac{1}{T_I \cdot s} - \frac{\beta}{1 + T_I \cdot s} \right) SV - \frac{1}{T_I \cdot s} PV$$

Therefore, the subtractors 15 and 71, integral operation unit 17, and the lag operation unit 69 constitute a lead/lag operation means so that the manipulated signal MV can be represented as follows.

$$MV = Kp \left\{ \left( \alpha + \frac{1}{T_I \cdot s} - \frac{\beta}{1 + T_I \cdot s} \right) SV - \left( 1 + \frac{1}{T_I \cdot s} \right) PV \right\}$$

It will be seen from the above that in the process controller of the present embodiment a control similar to that for the case shown by FIG. 28 is carried out when the coefficients α and β are changed. Namely, for a change in the set point value SV, it is possible to vary equivalently only the integral time for the set point value change, by varying the coefficients α and β, with the integration term for disturbance kept fixed. In addition, in contrast to the case of FIG. 28 in which a lead/lag operation unit is required to vary the integral time, the present embodiment has an advantage that it does not need such a complicated operation unit, but can be constructed with a simple first order lag element.

PROCESS VALUE COMPENSATION TYPE

It is also possible to constitute an improved process control system with two degrees of freedom by the provision of adjusting means for feeding back a control value.

Figure 34:
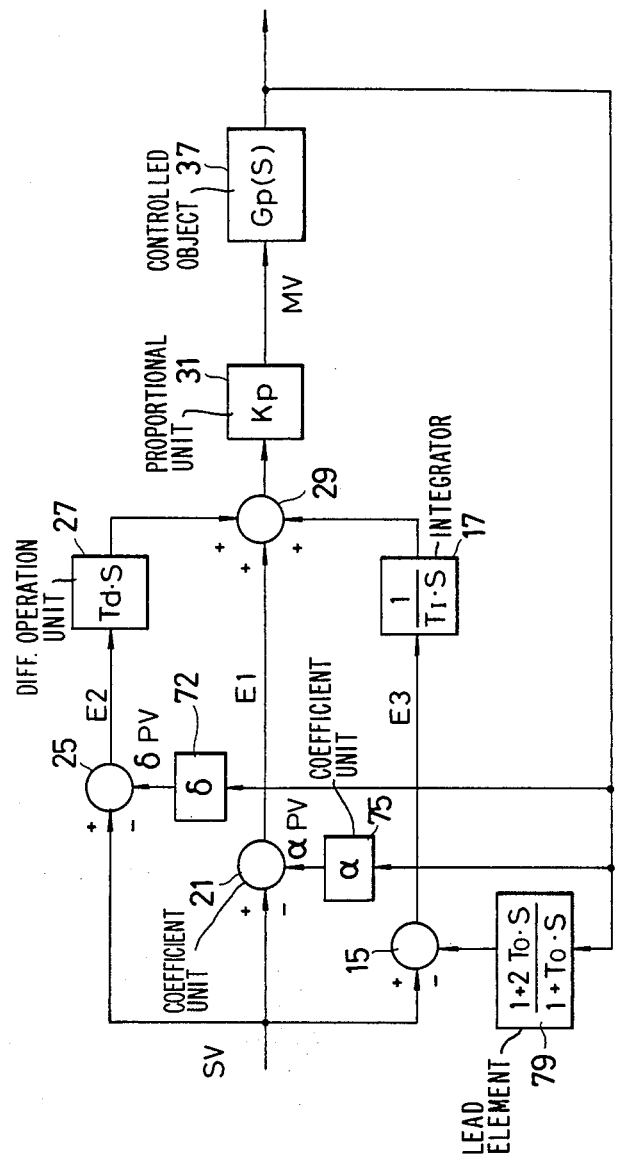
FIG. 34 is a functional block diagram for illustrating the structure of an eleventh embodiment of the present invention.

Such a process controller is shown in FIG. 34 as an eleventh embodiment of the invention. The controller is different from the sixth embodiment illustrated in FIG. 23 in that, instead of the coefficient units for calculating the set point value SV, there are provided a first coefficient unit 75, a second coefficient unit 72 and a lead element 79 with a transfer function $(1+2\cdot T_o \cdot s)/(1+T_o \cdot s)$, in the inputting routes of the control value PV.

Namely, first, the control value PV is input in parallel to the first coefficient unit 75, the second coefficient unit 72, and the lead element 79. The control value PV is multiplied by the coefficient α in the first coefficient unit 75, and its output α PV is input to a first subtractor 21 where the deviation $E_1$ from the set point valve SV is computed. In the second coefficient unit 72, the control value PV is multiplied by δ, and its output δ PV is input to a second subtractor 25 where the deviation $E_2$ from the set point value SV is computed, and the deviation $E_2$ undergoes a differential operation with respect to derivative time $T_D$ in a differential operation unit 27. Further, the output LPV from the lead element 79 obtained from the process value PV is input to a third subtractor 15 where the deviation $E_3$ from the set point value SV is computed, and the deviation $E_3$ undergoes an integral operation with respect to an integral time $T_I$ in an integral operation unit 17.

Then, the deviation $E_1$, the differentiated value of the deviation $E_2$ by the differential operation unit 27, and the integrated value of the deviation $E_3$ by the integral operation unit 17 are input to an adder 29 where they are synthesized additively. After the result is input to a proportional operation unit 31 where it is multiplied by the proportional gain Kp, it is impressed on the control object 37 as a manipulated signal MV. In this way, the control value PV is controlled to become equal to the set point value SV.

With such a construction for the controller, it becomes possible to optimize the process for both "set point value following" and "disturbance suppression" by setting the PID parameters Kp, $T_I$, and $T_D$, the coefficients α and δ, and the time constant $T_o$ of the lead element 79 as follows.

(I) First, the PID parameters Kp, $T_I$, and $T_D$ are set to the optimum parameters for set point value Kp*, $T_I$*, and $T_D$* of a standard PID controller.

The controller behaves identically to the standard PID controller, as may be seen from its construction. Therefore, by the above setting, there are obtained for the set point value SV an operation that follows the optimum parameters for set point value $Kp^*$, $T_I^*$, and $T_D^*$ so that the response of the controller for the set point value SV is satisfactory.

(II) Next, the coefficients $\alpha$ and $\delta$ are set as follows based on the optimum proportional gain for disturbance Kp, optimum derivative time for disturbance $T_D$, optimum proportional gain for set $Kp^*$, and optimum derivative time for set point value $T_D^*$, among the optimum parameters for disturbance and for set point value in the standard PID controller.

$$\alpha = Kp/Kp^*,$$

$$\delta = \alpha \times T_D/T_D^*$$

In this controller, by the action of the coefficients $\alpha$ and $\delta$, the actual proportional gain and the actual derivative time for the control value PV are $\alpha \times Kp$ and $\delta \times Kp \times T_D$, respectively. Therefore, when the coefficients $\alpha$ and $\delta$ are set as above, the actual proportional gain and the actual derivative time for the control value PV are Kp and $Kp \times T_D$, respectively, as Kp and $T_D$ are set already to $Kp^*$ and $T_o^*$. Namely, for the process value, there will be obtained a proportional and differential operation which is similar to that when the standard PID controller is set to the optimum parameters for disturbance Kp, $T_I$, and $T_D$.

(III) Next, the actual integral time for the process value PV is set, by adjusting the time constant, $T_o$, to be equal to the actual integral time $T_I^*/Kp$ which is obtainable by setting the parameters for the standard PID controller to the optimum parameters for disturbance $Kp^*$, $T_I^*$, and $T_D^*$.

The time constant $T_o$ may be adjusted as taught in the manner explained in conjunction with the sixth embodiment. Namely the integral term ID3 operative to disturbances can be rearranged as follows.

$$\frac{\Delta PV}{T_I \cdot s} + \frac{T_o}{T_I} \left( \frac{\Delta PV}{1 + T_o \cdot s} \right)$$

As understood from the above equation in this embodiment, when $T_o$ increases the integral time decreases, different from the sixth embodiment in which the integral time increases when $T_o$ increases.

Figure 35:
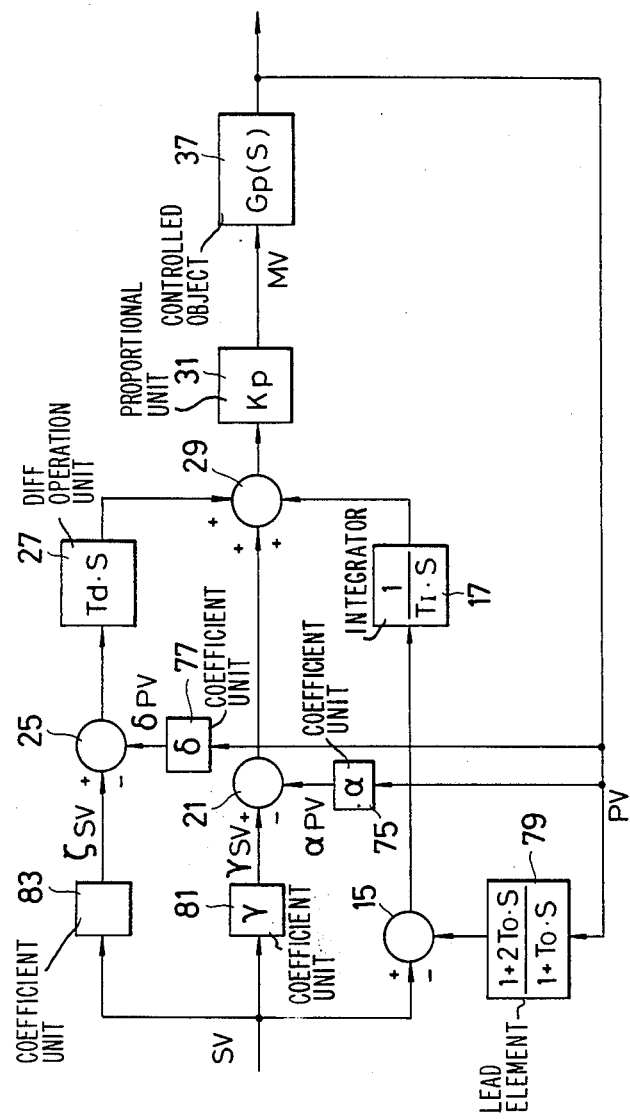
FIG. 35 is a functional block diagram for illustrating the structure of a twelfth embodiment of the present invention.

FIG. 35 shows a block diagram for a controller according to a twelfth embodiment of the present invention.

As shown in the figure, the controller of the present embodiment has a first subtractor 21, a second subtractor 25, a third coefficient unit 81 and a fourth coefficient unit 83, respectively. The present embodiment has a different characteristic in that the signal $\gamma$ SV obtained by multiplying the set point value SV by the coefficient $\gamma$ of the third coefficient unit 81 is supplied for proportional operation, and the signal $\xi$ SV obtained by multiplying the set point value SV by the coefficient $\xi$ of the fourth coefficient unit 83 is supplied for differential operation.

By the addition of the third and fourth coefficient units 81 and 83, the optimization becomes further simplified.

Further, it is possible to select various kinds of prior control systems by assigning "1" or "0" to the coefficients $\alpha$, $\delta$, $\gamma$ and $\xi$. For example, by choosing the time constant $T_o = 0$ the following results are obtained.

(I) When $\alpha = \delta = \gamma = \xi = 0$

This corresponds to eliminating the first through the fourth coefficient units so that it becomes equivalent to the standard PID controller.

(II) When $\alpha = \delta = \gamma = 1$ and $\xi = 0$

This corresponds to operating the differential operation only on the control value PV so that it becomes equivalent to the PID controller with differentiation for PV.

(III) When $\alpha = \delta = 1$ and $\gamma = \delta = 0$

This corresponds to applying the proportional and differential operations to the control value PV alone so that it becomes equivalent to the I-PD controller.

As described in the above, the controller if the present embodiment eliminates the defects that existed in the prior art, and at the same time, is able to choose freely the various kinds of control systems of the prior art so that it possesses a high controllability and a wide usability.

Accordingly, by distributing the controller within a plant, it becomes possible to optimize each control of the plant for both disturbance and set point value. Therefore, it becomes possible to respond to the recent severe demands that have been mentioned earlier, with a profound contribution to the industrial world.

Figure 36:
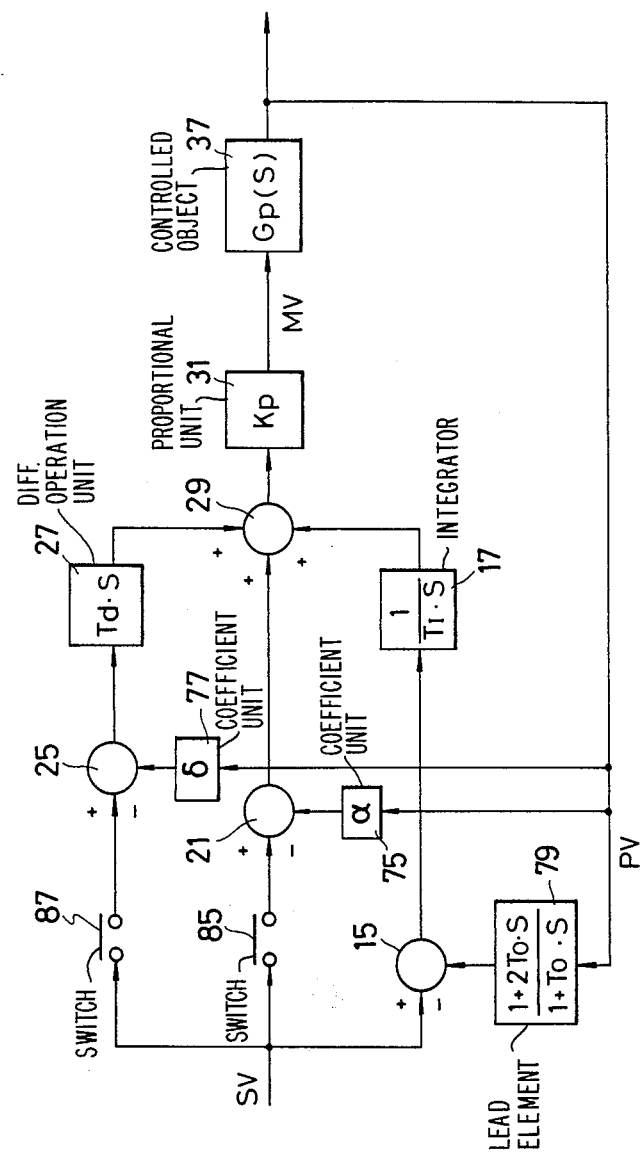
FIG. 36 is a functional block diagram for illustrating the structure of a thirteenth embodiment of the present invention.

Further, FIG. 36 shows a block diagram for a thirteenth embodiment of the invention. The controller of the present embodiment is obtainable from the embodiment shown in FIG. 35 by replacing the third and fourth coefficient units 81 and 83 respectively by first and second switches 85 and 87. This corresponds to an arrangement in which the coefficients $\gamma$ and $\xi$ of FIG. 35 are replaced by "0" or "1". Therefore, it is possible to optimize the controller for both disturbance and changes in set point value, as well as it is possible to select the prior control systems in the same way as in the twenty-fifth embodiment.

It should be mentioned that although the perfect differentiation ($T_D \cdot s$) is used in the embodiments of FIGS. 35 and 36, an imperfect differentiation ($T_D/(1+\eta \cdot T_D \cdot s)$ with $\Theta = 0.2-0.3$) may be used in practice.

Figure 37:
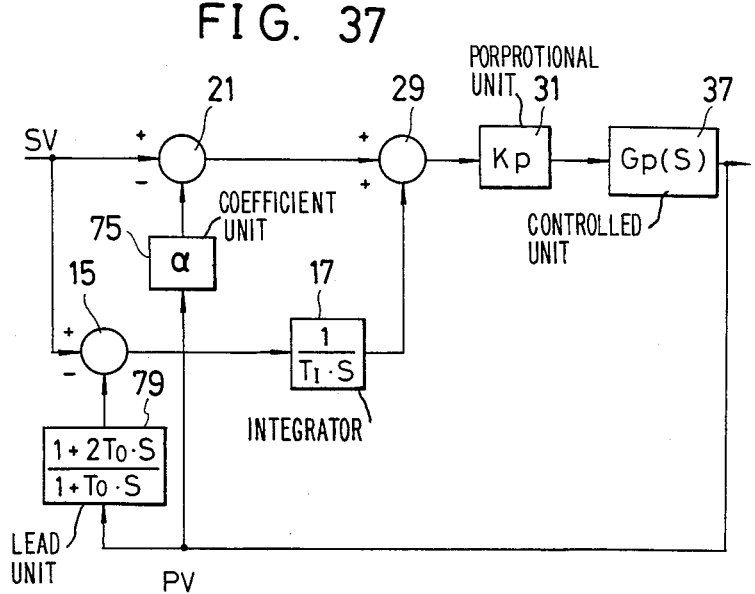
FIG. 37 is a functional block diagram for illustrating the structure of a fourteenth embodiment of the present invention.

FIG. 37 shows a block diagram for a controller according to a fourteenth enmbodiment of the present invention.

As shown in the figure, the controller is obtainable from the embodiment of FIG. 35 by eliminating the second coefficient unit 77 and the second subtractor 25 and the differential unit 27.

Figure 38:
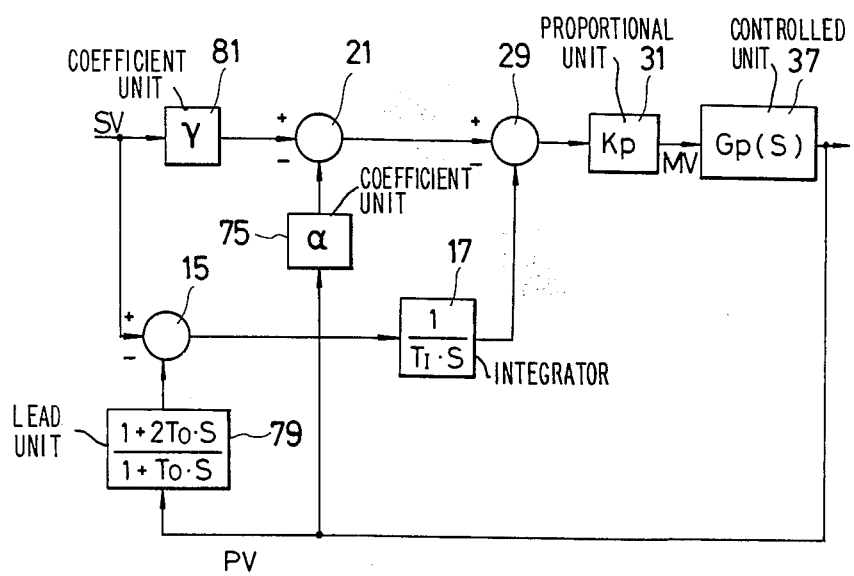
FIG. 38 is a functional block diagram for illustrating the structure of a fifteenth embodiment of the present invention.
Figure 39:
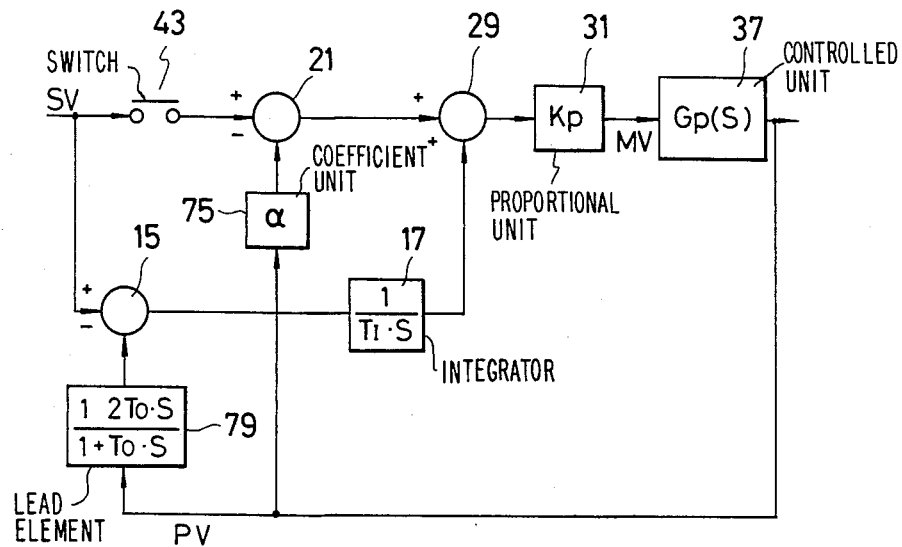
FIG. 39 is a functional block diagram for illustrating the structure of a sixteenth embodiment of the present invention.

Moreover, FIGS. 38 and 39 show block diagrams for controllers that concern fifteenth and sixteenth embodiments of the present invention. The controllers correspond to the embodiments of FIGS. 35 and 36 from which elements that are related to the differential operation are eliminated.

The fifteenth through sixteenth embodiments are used when PI control alone is sufficient in the processing.

Furthermore, as a modification to the eleventh through sixteenth embodiments one may use the following.

(I) The transfer function $G_L(s)$ for the lead element 79 may be rearranged as follows.

$$G_L(s) = 1 + \frac{T_o \cdot s}{1 + T_o \cdot s}$$

Figure 40:
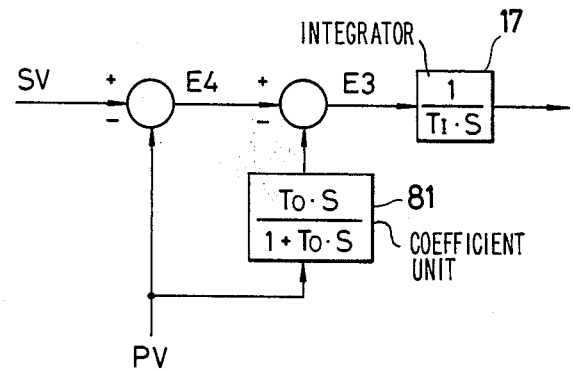
FIG. 40 shows another configuration embodying the integration operation of the sixteenth embodiment.

Therefore, an equivalent result can be obtained as shown by FIG. 40 by finding the deviation E4 between the set point valve SV and the control value, PV, finding the deviation E3 between the deviation E4 and the signal obtained from the control value PV by letting it go through a filter 81 using the transfer function shown by the second term in the above equation, and adding the deviation E3 to the integral operation unit 17.

Figure 41:
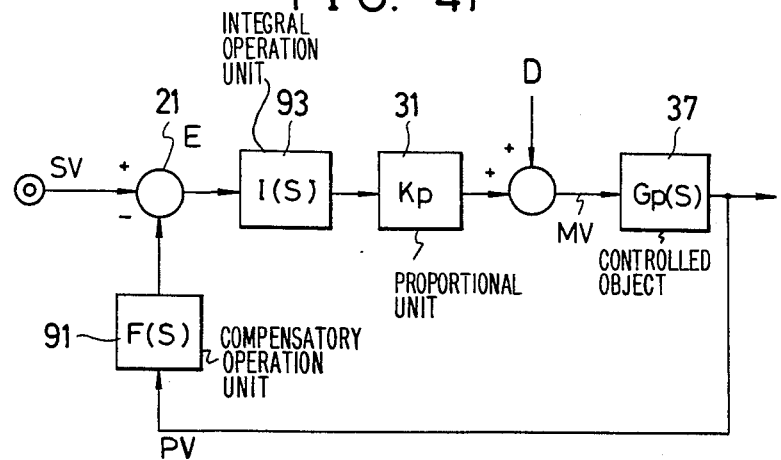
FIGS. 41 and 42 are functional block diagrams for illustrating the structure of a seventeenth embodiment of the present invention.
Figure 42:
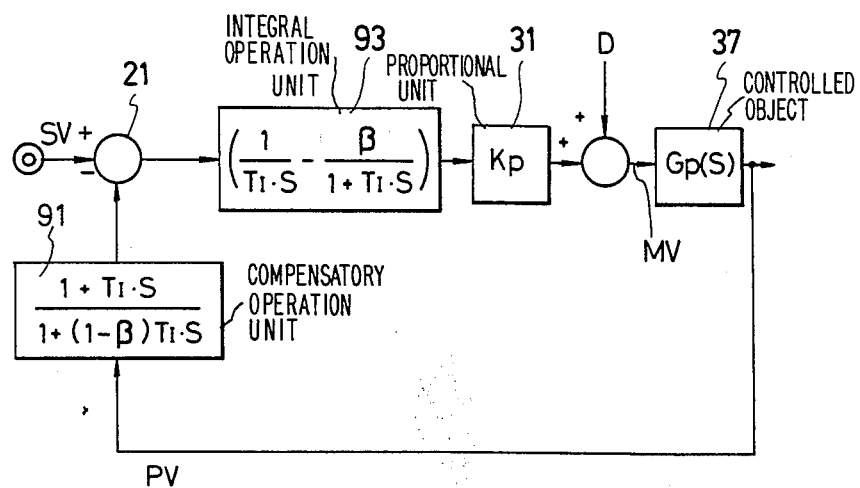

FIGS. 41 and 42 are block diagrams for showing the construction of a seventeenth embodiment of the device of the present invention.

In FIG. 41, the control valve PV is input to a subtractor 21 via a compensatory operation unit 91.

In the subtractor 21, deviation E between the set point value SV and the control value PV is found, and the result is supplied to an integral operation unit 93.

In the integral operation unit 93, integral operation is applied to the deviation E, the output signal undergoes a proportional operation in a proportional operation unit 31, and the result is supplied to a control object 37 as the manipulated signal MV. In this way, control is carried out to equalize the control value PV and the set point value SV.

Here, functions F(s) and I(s) for the compensatory operation unit 91 and the integral operation unit 93 of the present invention are set in the following way.

First, the response in FIG. 41 is given by the following.

$$PV = \frac{I(s) \cdot G(s)}{1 + (Fs) \cdot I(s) \cdot G(s)} \times SV + \qquad (32)$$

$$\frac{G(s)}{1 + (Fs) \cdot I(s) \cdot G(s)} \times D$$

In the above equation, F(s) and I(s) are set as $$F(s) \cdot I(s) = \frac{1}{T_I \cdot s}, \qquad (33)$$

$$I(s) = \frac{1}{T_I \cdot s} - \frac{\beta}{1 + T_I \cdot s} \qquad (34)$$

In Eq. (33), F(s)·I(s) is set to optimize the suppression of the disturbance, and I(s) in Eq. (32) is set in order to make the characteristics for following the set point value variable.

Further, as may be seen from FIG. 41, one has to have F(s)=1 for a steady state where there is no change in the set point value SV.

Therefore, according to the final value theorem, the transfer function F(s) has to satisfy $$\lim_{s \to 0} F(s) = 1 \qquad (35)$$

Determining the transfer function F(s) from Eqs. (33), (34), and (35) one has $$F(s) = \frac{\frac{1}{T_I \cdot s}}{\frac{1}{T_I \cdot s} - \frac{\beta}{1 + T_I \cdot s}} = \frac{1 + T_I \cdot s}{1 + (1 - \beta)T_I \cdot s} \qquad (36)$$

It is easy to see that the above transfer function satisfies the final value theorem.

A construction for transfer functions F(s) and I(s) is shown in FIG. 42.

Namely, the function F(s) for the compensatory operation unit 91 shows a lead/lag operation, and the function I(s) for the integral operation unit 93 shows a synthesis of an integration and a first order lag. It means that the integral time for a change in the set point value can be equivalently varied with the integral time for a change in the disturbance kept at a fixed value.

Figure 43:
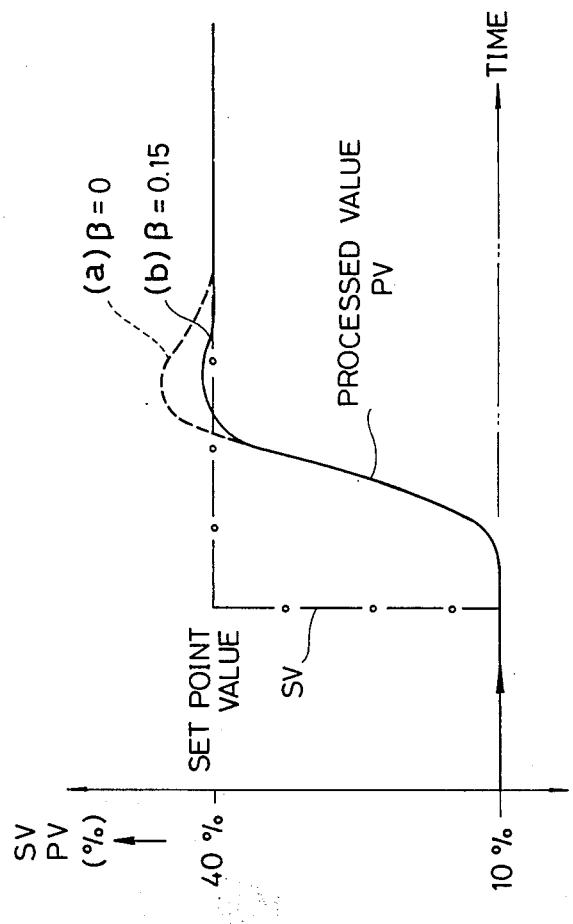
FIG. 43 shows the response characteristics following set point values of the seventeenth embodiment.

FIG. 43 shows the response to a change in the set point value SV in a state where the characteristics for suppressing disturbance in the control object 37 is optimum for a transfer function $$G(s) = \frac{1}{1 + 5s} e^{-2s}$$

It shows that by setting the control constants Kp, $T_I$, and $T_D$ to the optimum condition for suppressing disturbance (Kp=2.59, $T_I$=3.41 seconds, and $T_D$=0.56 seconds), and fixing the characteristics for suppressing disturbance to the optimum condition, it is possible to improve markedly the characteristics for following the set point value by varying equivalently the integral time for change in set point value by setting the coefficient $\beta$. Namely, although the response shows a large overshoot as shown by designation (a) for $\beta$=0 (the case of prior example where there is no compensation for the integral time $T_I$), the characteristics for following set point value is substantially improved as shown by designation (b), without changing at all the characteristics for suppressing disturbance, by varying the equivalent integral time for set point value.

Figure 44:
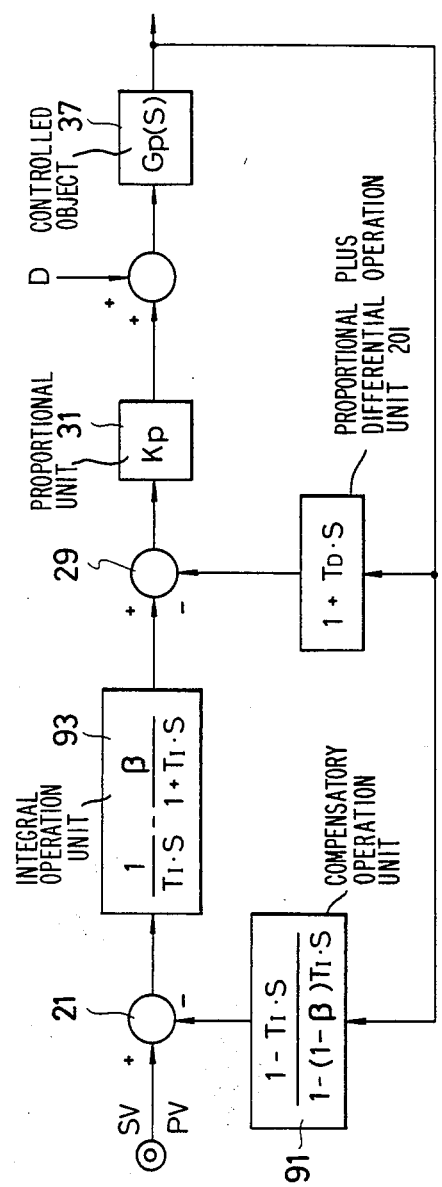
FIG. 44 is a functional block diagram for illustrating the structure of an eighteenth embodiment of the present invention.

FIG. 44 is a block diagram for illustrating the construction of an eighteenth embodiment of the present invention.

The figure shows a second PID controller of I-PD control type. The deviation between the set point value SV and the control value PV that has undergone a lead/lag operation in the compensatory operation unit 91, goes through an integral operation in the integral operation unit 93.

On the other hand, the control value PV undergoes proportional and differential operations in a proportional+differential operation unit 201. After the output of the proportional and differential operation is subtracted from the integration output in a subtractor 95, the result is multiplied in a proportional operation unit 31 by the proportional gain Kp, and the result is output to the control object 37 as a manipulated output MV.

As may be seen from the figure, the present embodiment optimally controls the suppression of disturbance by carrying out PID control for variations in the disturbance D. Moreover, for changes in the set point value, it is possible to give an optimal control for the characteristics for following set point value by adjusting the coefficient $\beta$, with the characteristics for suppression of disturbance fixed.

Figure 45:
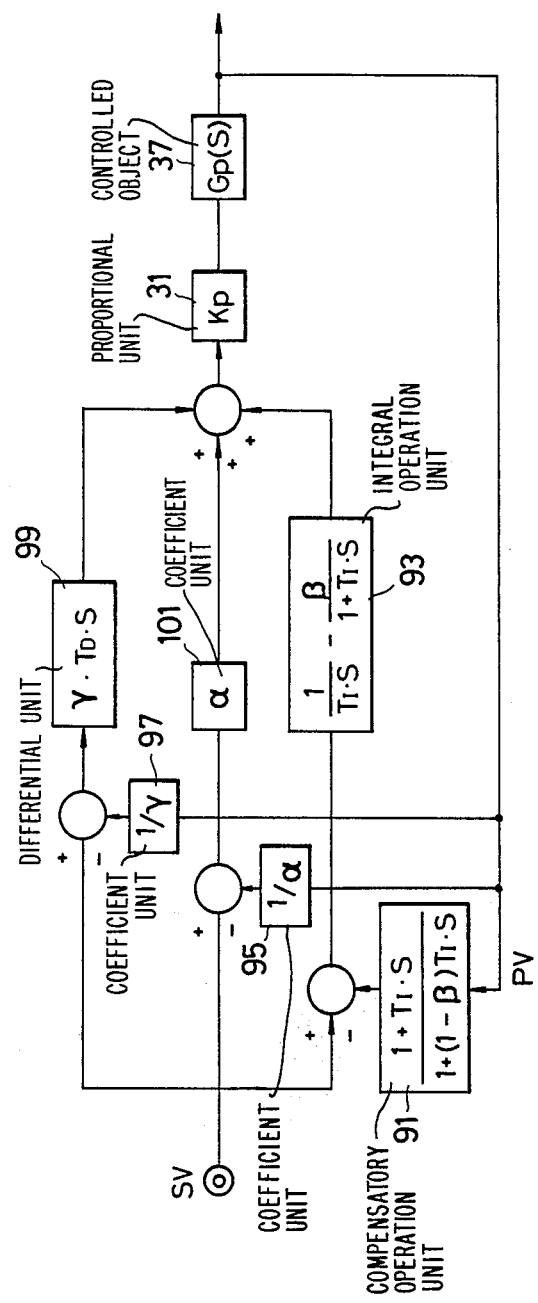
FIG. 45 is a functional block diagram for illustrating the structure of a nineteenth embodiment of the present invention.

FIG. 45 shows a block diagram for illustrating the construction of a nineteenth embodiment of the device in accordance with the present invention.

In this embodiment multiplied coefficients in coefficient blocks 95 and 97 to be multiplied by the control value PV and fed back to the differential operation unit 99 and to the integral operation unit 93 are given by 1/α and 1/γ, respectively, and the integral operation portion is the same as in the embodiment of FIG. 41. With such a construction, it is possible to achieve the effects that are similar to those for the embodiments of FIG. 41.

Figure 46:
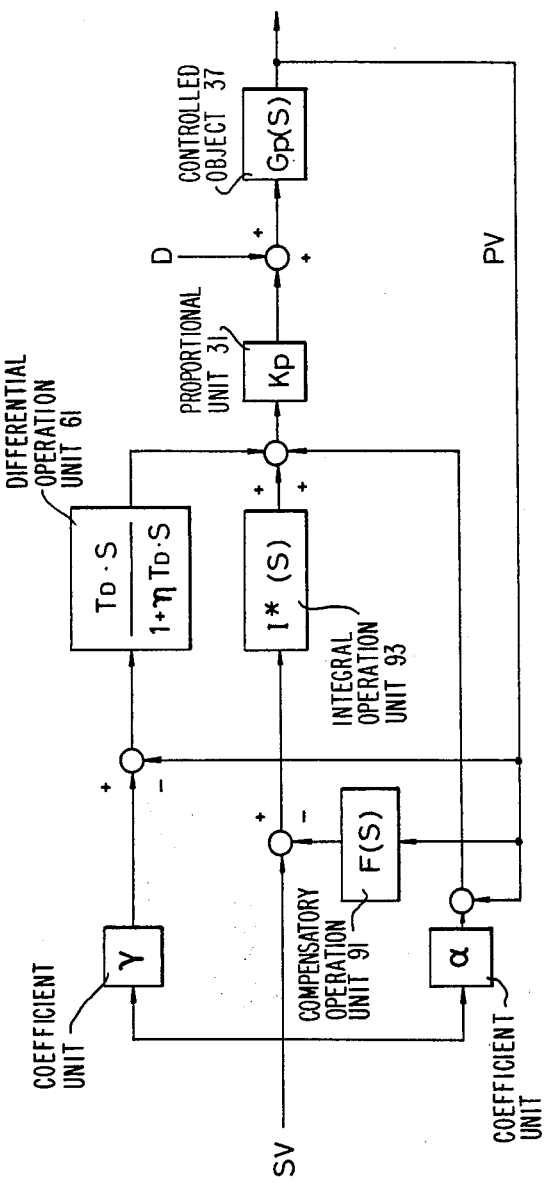
FIGS. 46 and 47 are functional block diagrams for illustrating the structure of a twentieth embodiment of the present invention.
Figure 47:
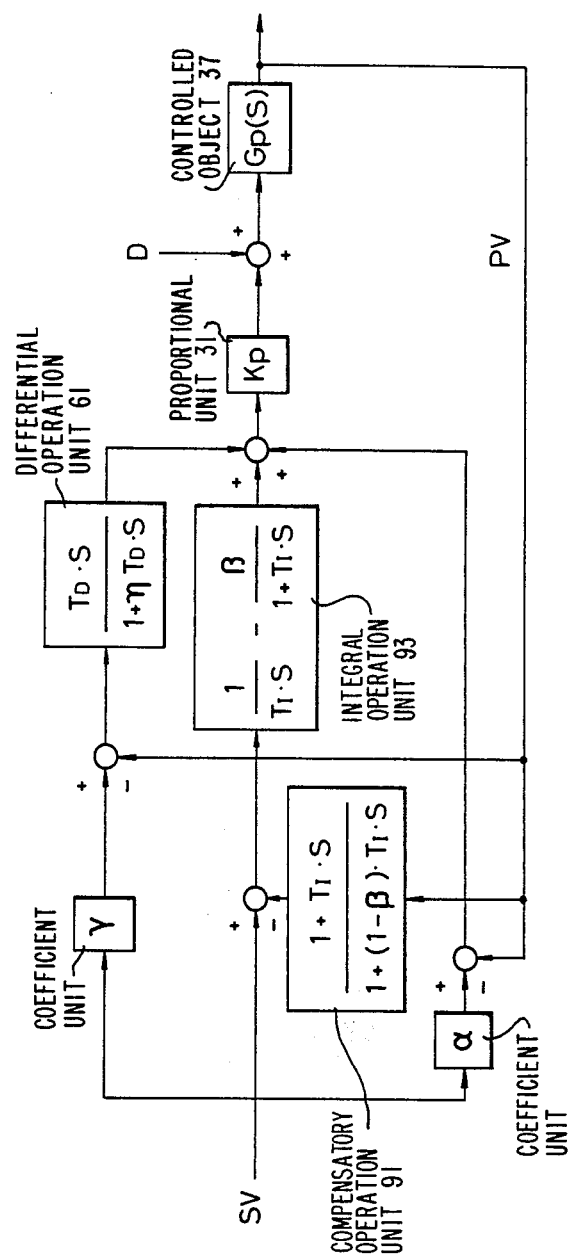

FIGS. 46 and 47 show block diagrams that illustrate the construction of a twentieth embodiment of the device in accordance with the present invention.

The present embodiment is similar to the seventeenth embodiment shown in FIGS. 41 and 42, the so-called two degree of freedom PID controller of the type with a filter for the control process value.

Therefore, as explained in connection with the seventeenth embodiment, the control constants $K_p$, $T_I$, and $T_D$ are set to the optimum values for suppressing disturbance, and the proportional gain $K_p$ is optimized by the coefficient $\alpha$, and for derivative time $T_D$ by the coefficient $\gamma$.

Further, the function $I(s)$ for the integral operation unit 93 of FIG. 41 is determined by Eq. (34), and the function $F(s)$ for the compensatory operation unit 91 is determined by Eq. (36).

On the other hand, the coefficients $\alpha$, $\beta$ and $\gamma$ are determined as in the following.

If one calls the optimum control constants for suppressing disturbance $K_p$, $T_I$, and $T_D$, the optimum control constants for following set point value $K_p^*$, $T_I^*$, and $T_D^*$, and the optimum control algorithm for following set point value $C^*(s)$, one obtains $$C^*(s) = K_P^*\left(1 + \frac{1}{T_I^* \cdot s} + \frac{T_D^* \cdot s}{1 + \eta \cdot T_D^* \cdot s}\right)$$

$$= K_P\left(\alpha + \frac{\beta_o}{T_I \cdot s} + \frac{\gamma \cdot T_D \cdot s}{1 + \eta \cdot \gamma \cdot T_D \cdot s}\right)$$

from which there follows $$\alpha = \frac{K_P^*}{K_P},$$

$$\beta_o = \alpha \cdot \frac{T_I}{T_I^*} \simeq 2 \times \beta,$$

$$\gamma = \alpha \cdot \frac{T_D^*}{T_D}$$

Here, the coefficients $\alpha$, $\beta$ and $\gamma$ become the optimum values in the ranges of $0<\alpha 1$, $0<\beta<1$, and $0<\gamma<1$.

FIG. 48 shows variations in the PID structure that can be realized by changing in the parameters $\alpha$, $\beta$, and $\gamma$. As shown in the figure, if all of the coefficients $\alpha$, $\beta$, and $\gamma$ are varied (setting No. 6), a perfect two degrees of freedom PID controller is obtained.

In the response characteristics for following set point value (FIG. 49), with the control constants $K_p$, $T_I$, and $T_D$ set to the optimum values for suppressing disturbance for the case of the control object with $G(s)=e^{-2s}/(1+5s)$, it is possible to improve the characteristics for the rise in the response curve in the I-PD control by keeping the magnitude of overshoot unchanged on the order of $\alpha=0.2$.

Figure 50:
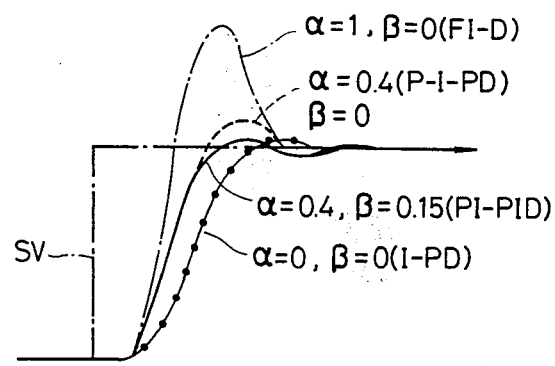
FIG. 50 shows the response characteristics following set point values in two imperfect degrees of freedom controller.

FIG. 50 shows with respect to the same control object the response characteristics for following set point value for the case of $\alpha=0.4$ in an imperfect two degrees of freedom controller (P-I-PD control of setting No. 4), and the change in set point value for the case of $\alpha=0.4$ and $\beta=0.15$ in a perfect two degrees of freedom controller (PI-PID control). As may be seen, it is possible to suppress the overshoot without barely changing the rising characteristics, by changing the equivalent integral time through the coefficient $\beta$.

Figure 51:
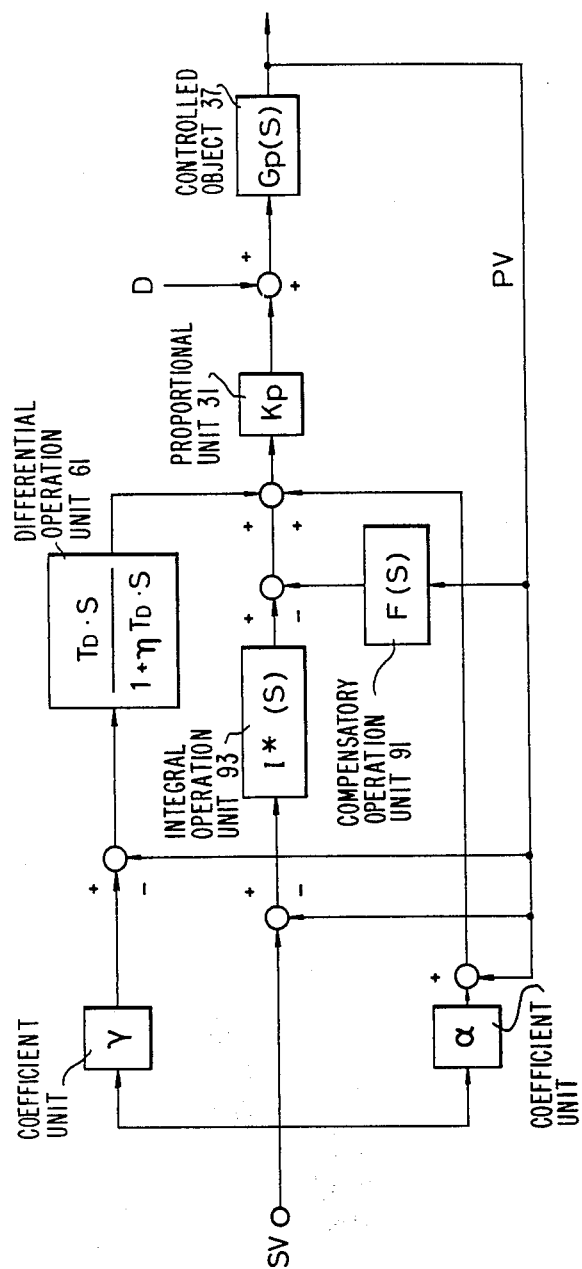
FIGS. 51 and 52 are functional block diagrams for illustrating the structure of a twenty-first embodiment of the present invention.
Figure 52:
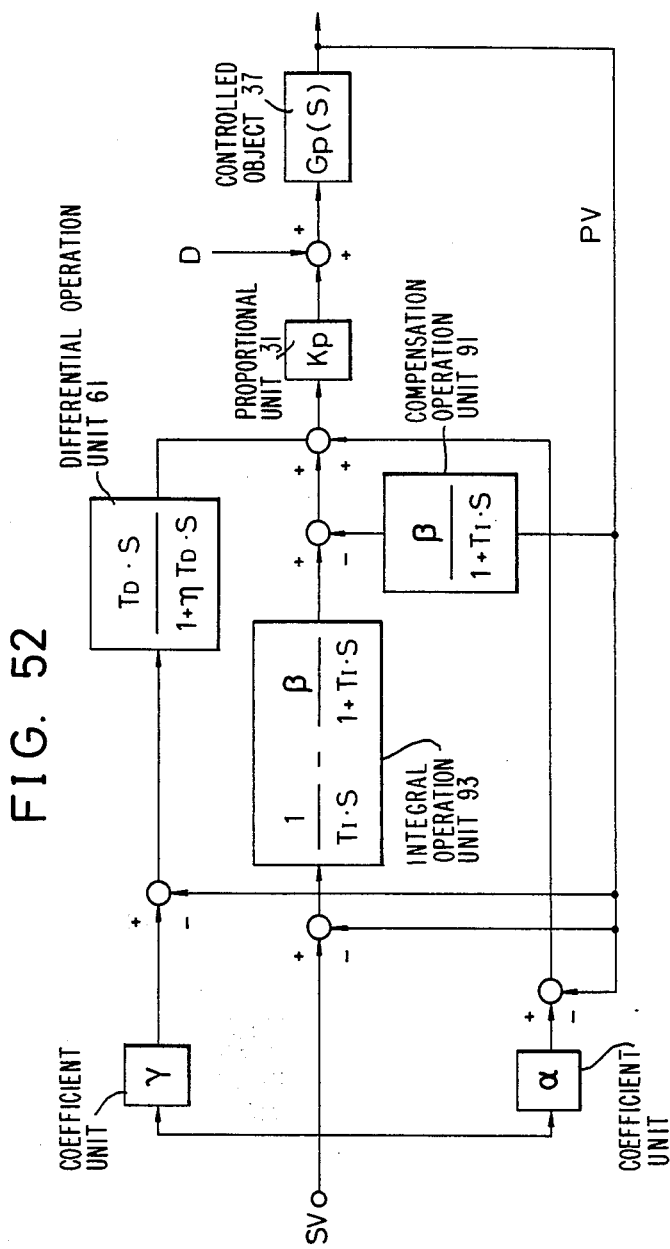

In FIG. 51 and FIG. 52 are shown block diagrams for illustrating the construction of a twenty-first embodiment of the device in accordance with the present invention.

The present embodiment is the so-called two degrees of freedom PID controller of a set point value feedback type. The differences from the twentieth embodiment are that the control value PV fed back via the compensatory operation unit 91 is subtracted from the set point value SV which has undergone the integral operation in the integral operation unit 93.

The function $F(s)$ for the compensatory operation unit 91 is set as $$F(s) + I^*(s) = \frac{1}{T_I \cdot s}, \tag{37}$$

$$I^*(s) = \frac{1}{T_I \cdot s} - \frac{\beta}{1 + T_I \cdot s} \tag{38}$$

Equation (37) sets the controller to the optimum condition of characteristics for suppressing disturbance while Eq. (53) is for setting the controller to the optimum condition of characteristics for following set point value.

As a condition, it is required that the final value theorem $$\lim_{2 \to 0} \frac{I^*(s)}{F(s) + I(s)} = 1 \tag{39}$$

must be satisfied.

From Eqs. (37) and (38) there is obtained $$F(s) = \frac{\beta}{1 + T_I \cdot s} \tag{40}$$

Figure 59A:
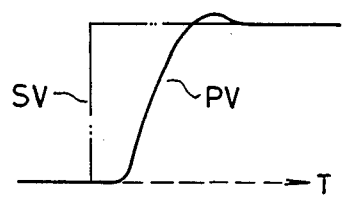
FIGS. 59(A), 59(B) and 60 show examples of the response characteristics of the twenty-fifth embodiment.
Figure 59B:
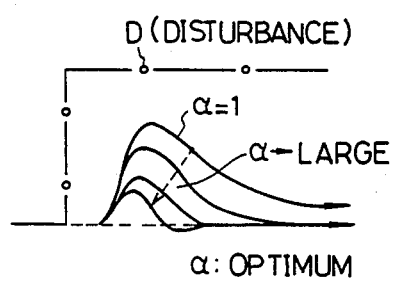

It is easy to see that Eq. (40) satisfies the condition given by Eq. (39). In FIG. 59(A) and (B) is shown a concrete construction of the present embodiment.

Moreover, the variation in the PID structure realized by changing the coefficients $\alpha$, $\beta$, and $\gamma$ are set in FIG. 48.

Figure 49:
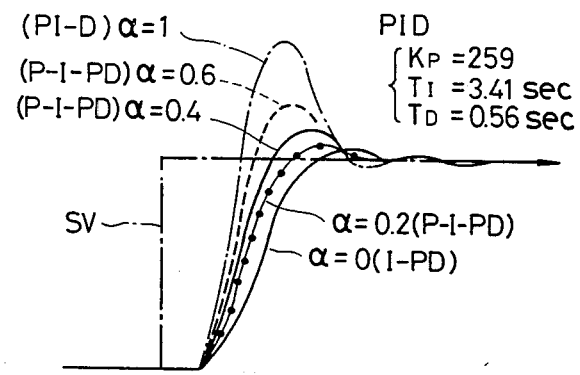
FIG. 49 shows the response characteristics following set point value of the twentieth embodiment.

In the structure above, it is possible to realize response characteristics that are similar to those of FIGS. 49 and 50.

A twenty-second embodiment as shown in FIGS. 53 through 57 is an interference type controller.

In the figures, 91 is a compensatory operation unit which applies a compensatory operation to the control value PV from a control object 37, and supplies the compensatory control value PV' to a deviation operation unit 21. The deviation compensation unit 21 determines the deviation between the compensatory control value PV' and a set point value SV, and outputs the result to a control operation unit 105. The control operation unit 105 is provided with a transfer function $C^*(s)$ (interference-type) which compensates and corrects the control constants $K_p$, $T_I$ and $T_D$ that are to be set by the adjusting parameters $\alpha$ and $\delta$ under the optimum condition of characteristics for suppressing disturbance by means of CHR method or the like. For the proportional and differential operations, the transfer function $C^*(s)$ corrects and sets the control constants $K_p$ and $T_D$ in the optimum condition of characteristics for suppressing disturbance to the control constants Kp* and $T_D$* for the optimum condition of characteristics for following set point value. The proportional, integral, and differential operations are carried out for the deviation based on the control constants Kp*, $T_I$ and $T_D$* to obtain the adjusted output MV which is output to the control object 37.

$$C^*(s) = K_P\left(\alpha + \frac{1}{T_I \cdot s}\right)\left(\frac{1 + \delta \cdot T_D \cdot s}{1 + \eta \cdot T_D \cdot s}\right) \quad (41)$$

$$= \left(K_*P + \frac{1}{T_I \cdot S}\right)\left(\frac{1 + \delta \cdot T_D^* \cdot s}{1 + \eta \cdot T_D \cdot s}\right) \quad (42)$$

Here, the adjusting parameter corrects the proportional gain and δ varies the derivative time. The values for these parameters can be computed as taught heretofore, using the values given by CHR method or the like. For instance, for no overshoot and minimum setting time in the case of adjusting mode of PID, α=0.63 and δ=1.25.

$$\alpha = \frac{K^{P*}}{K_P} \; ; \; \delta = \frac{T_D^*}{T_D}$$

However, for variations in the control value PV, the control constants Kp* and $T_D$* adjusted to the optimum condition of characteristics for following set point value give a small gain and a large setting time. For this reason, the compensatory operation unit 91 carries out for the control value PV a compensatory operation based on the transfer function H(s) shown by Eq. 43 to obtain a compensatory control value PV', in order to correct the control constants Kp* and $T_D$* that are set to the optimum condition of characteristics for suppressing disturbance to the control constants Kp and $T_D$, that is, to remove the influence due to the correction component in the adjusting parameters.

$$H(s) = \left(\frac{1 + T_I \cdot s}{1 + \alpha \cdot T_I \cdot s}\right)\left(\frac{1 + T_D \cdot s}{1 + \delta \cdot T_D \cdot s}\right) \quad (43)$$

In this manner, the control operation unit 105 carries out constantly the operation of adjusting to the optimum condition for following the changes in the set point value. As to the variations in the control value PV due to disturbance, the compensatory operation unit 91 carries out first a compensatoryoperation which virtually adjusts the control constants Kp*, $T_I$*, and $T_D$* for the control operation unit to those of the optimum condition for suppressing disturbance. Then, the compensatory operation unit 91 outputs the result to the control operation unit 105 through the unit 21. In this way, there is realized a two degrees of freedom controller which can be adjusted in mutually independent manner to conditions that are optimum for both of following the set point value and suppressing disturbance.

Next, the operating principle of the present embodiment will be described.

Figure 53:
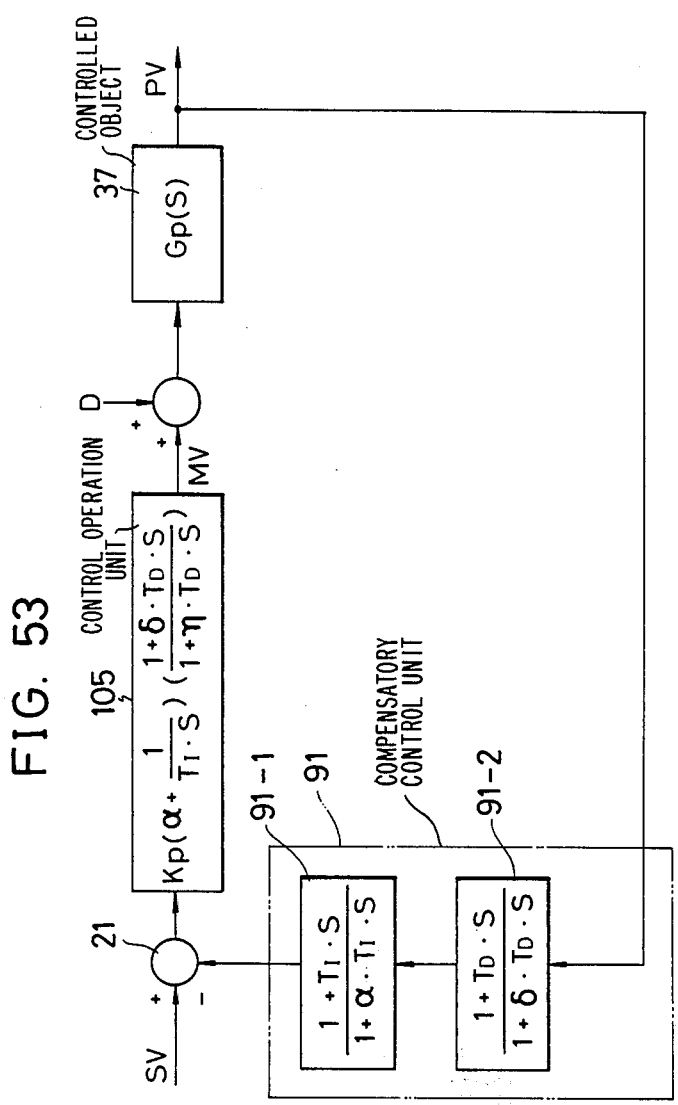
FIG. 53 is a functional block diagram for illustrating the structure of a twenty-second embodiment of the present invention.

The control response of the process shown in FIG. 53 can be represented by the following equation.

$$PV = \frac{C^*(s)G_p(s)}{1 + C^*(s) \cdot H(s) \cdot G_p(s)} \times SV + \quad (44)$$

-continued
$$\frac{G_p(s)}{1 + C^*(s) \cdot H(s) \cdot G_p(s)} \times D$$

According to Eq. (44) above, when a disturbance D is applied to the controller, it is only necessary to correct C*(s)H(s) in order to manipulate the response to the disturbance. Therefore, the compensatory operation unit 91 is provided in the controller to set C*(s)H(s) to be the transfer function C(s) for the optimum condition of characteristics for suppressing disturbance. In this case, it may be thought that by setting C*(s)H(s) to C(s), the response to the set point value SV is considered to be manipulated. However, as shown by Eq. (45), the construction in this case becomes equivalent to the construction in which only the response to the set point value can be varied by means of the adjusting parameters α and δ, in the state where the response to disturbance is set to the optimum suppression characteristics at all times.

$$PV = \frac{K_P\left(\alpha + \frac{1}{T_I \cdot s}\right)\left(\frac{1 + \delta \cdot T_D \cdot s}{1 + \cdot T_D \cdot s}\right) \cdot G_p(s)}{1 + K_P\left(1 + \frac{1}{T_I \cdot s}\right)\left(\frac{1 + T_D \cdot s}{1 + \cdot T_D \cdot s}\right) \cdot G_p(s)} \times SV + \quad (45)$$

$$\frac{G_p(s)}{1 + K_P\left(1 + \frac{1}{T_I \cdot s}\right)\left(\frac{1 + T_D \cdot s}{1 + \eta \cdot T_D \cdot s}\right) \cdot G_p(s)} \times D$$

In addition, in order for the process to be set in a steady state, it becomes necessary to satisfy the final value theorem. That is, the steady deviation must be zero in the case where the set point value SV is changed by a constant value in a step-like manner, with the disturbance D kept at a constant value. For this reason, the transfer function H(s) for the compensatory operation unit 91 has to satisfy the following equation, and Eq. (43) fulfils such a condition.

$$\lim_{s \to 0} H(s) = 1$$

As in the above, the compensatory operation unit 91 is provided to set for variations in the control value PV, the control constants that are adjusted to the characteristics for following set point value, virtually to the characteristics for suppressing disturbance, and does not affect the control response in the steady state.

Figure 54:
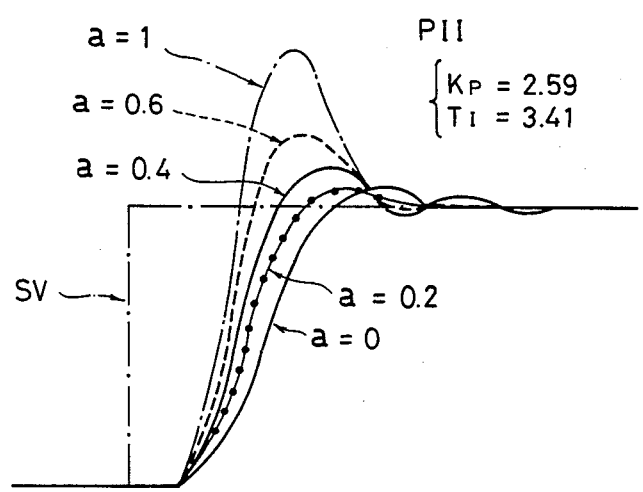
FIG. 54 shows the result of a simulation in response to control value PV in the case of a transfer function for control object according to the invention.

FIG. 54 shows the result of a simulation of the response control value PV for the case of a transfer function $G_p(s) = e^{-2L}/(1+5s)$ for the control object 37 by the adjusting parameters α and δ.

Moreover, since the present embodiment has a structure by which the response can be adjusted by means of the adjusting parameters, it is possible to realize various control forms by changing the values of the parameters α and δ, as is indicated by No. 2 in FIG. 54. In this case, the overall adjusting mode shows various control forms of interference type. Namely, for α=δ=1, it becomes the ordinary one degree of freedom PID control, for α=δ=0, it carries out I control alone for changes in the set point value while it carries out PID control for variations in the control value, and finally for 0<α<1 and 0<δ<1, it has a construction in which for changes in the set point value, it carries out PD control which can adjust the control constants Kp* and $T_D^*$, as well as I control with common control constant $T_I$, while for the control value, it carries out PD control that can be adjusted freely, as well as a common I control. The adjusting parameter α is for adjusting the proportional gain among the control constants, and it is possible to correct the rising characteristics and the overshoot condition of the response. Further, the parameter δ is for adjusting the derivative time, by the use of which it is possible to correct the rising characteristics of the response without affecting the overshoot condition too much.

If a disturbance is applied to the system in the state for which the control constants Kp, $T_I$, and $T_D$ and the adjusting parameters α and δ are set, the variation in the control value PV due to the disturbance is introduced to the compensatory operation unit 91. There, the control value PV is changed to a compensatory control value PV' which corrects the control constants Kp* and $T_D^*$ virtually to the optimum condition of characteristics for suppressing disturbance, the result is output to the deviation operation unit 21 where the deviation from the set point value SV is determined, and the deviation is output to the control operation unit 105.

When there is a change in the set point value SV, the control operation unit 105 computes an adjusted output u for the optimum condition of characteristics for following the deviation in the changed amount.

Figure 56:
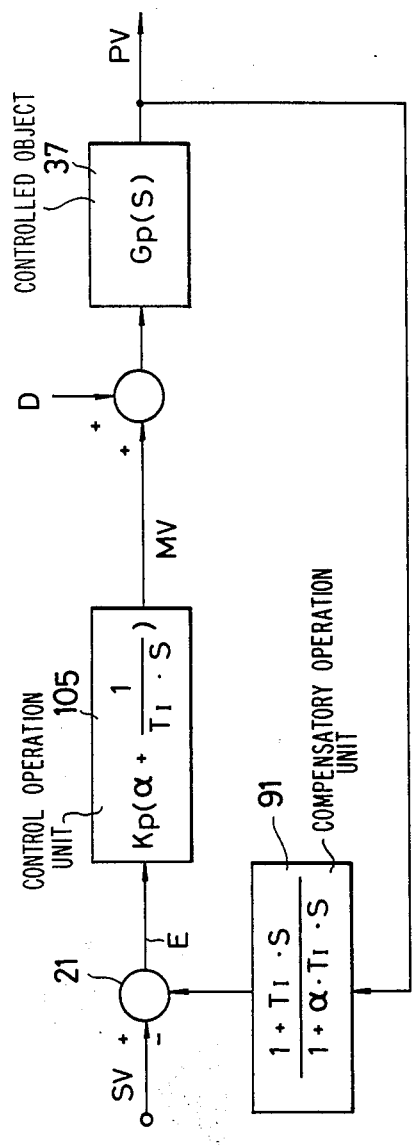
FIG. 56 shows a modified configuration of the twenty-second embodiment.

In this embodiment, all of the proportional, integral, and differential operations are carried out in the control operation unit 105, and both of the proportional and differential operations are carried out in the compensatory operation unit 91. However, according to the present invention, the control operation unit 105 needs only to have a construction of carrying out at least one of the operations, and the compensatory operation unit 91, depending upon the response of following the set point value, may have a construction in which each of proportional, integral, and differential operations are introduced singly or in a selective combination. For example, if the control operation unit 105 consists of proportional and integral operations and the compensatory operation unit 91 consists of the operation for compensating the proportional gain, then the construction is as shown by FIG. 56, and the control form realizable for this case is as shown by No. 1 of FIG. 55.

PROCESS VALUE FEEDBACK COMPENSATION TYPE

Figures 57, 58:
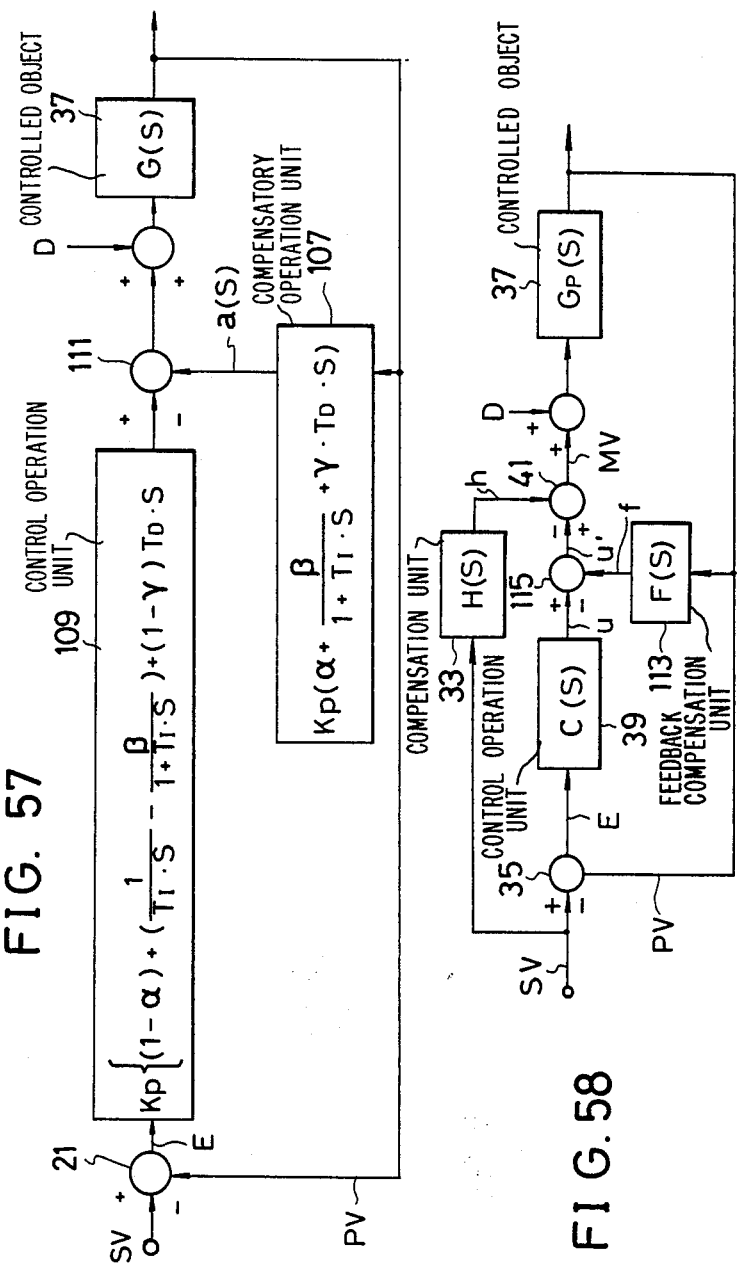
FIG. 57 is a functional block diagram for illustrating the structure of a twenty-third embodiment of the present invention.
FIG. 58 is a functional block diagram for illustrating the structure of a twenty-fifth embodiment of the present invention.

Referring to FIG. 57, a twenty-third embodiment of the present invention will be described. This embodiment is of a PID-PID control type with a simplified configuration.

In this embodiment, the control operation unit 109 carries out all of the proportional, differential, and integral operations based on the control constants Kp*, $T_I^*$, and $T_D^*$ in the optimum condition of characteristics for following set point value, and in addition, for the control value PV, it applies the same operations to the adjusted output from the operation unit 107 which compensates the control constants to those for the optimum condition of characteristics for suppressing disturbance, that is, to Kp, $T_I$, and $T_D$. Namely, in the embodiment of FIG. 53, the controller was of the type with a filter for control value in which, for the control value PV, the control constants Kp*, $T_I^*$, and $T_D^*$ are first compensated in the compensatory operation unit 91 to those of the condition for suppressing disturbance, and then the result is output to the control operation unit 105. In contrast, the present embodiment is of a control value feedback type in which, the part due to variations in the control value PV of the adjusted output that is computed at the control operation unit 109 for the condition of following the set point value, is corrected to the condition for suppressing the disturbance by means of the compensated output a(s) that is computed based on the control value PV.

In the control operation unit 109, as shown in Eq. (46), the control constants Kp, $T_I$ and $T_D$ that are set to the optimum condition of characteristics for suppressing disturbance are adjusted by adjusting parameters α, β, and γ to those for the optimum condition of characteristics for following set point value Kp*, $T_I^*$, and $T_D^*$, and the output that is computed in adjusting manner based on this adjusting is supplied to the operation unit 111.

$$C^*(s) = K_P\left((1-\alpha) + \left(\frac{1}{T_I \cdot s} - \frac{\beta}{1 + T_I \cdot s}\right) + (1-\alpha)T_D \cdot s\right) \quad (46)$$

$$= K_P^*\left(1 + \frac{1}{T_I^* \cdot s} + T_D^* \cdot s\right)$$

The operation unit 111 adds to the adjusted output the compensatory output a(s) that is obtained in the compensatory operation unit 107 by carrying out all of the proportional, integral, and differential compensatory operations for the control value PV based on Eq. (47). The added result is output to the control object 37 as the manipulated value u.

$$H(s) = K_P\left(\alpha + \frac{\beta}{1 + T_I \cdot s} + \gamma \cdot T_D \cdot s\right) \quad (47)$$

By this construction, there is supplied to the control object 37 a manipulated value u which is optimum for each of the change in the set point value and the variation in the control value PV.

Next, the control response of the present embodiment is as follows.

$$PV = \frac{C^*(s) \cdot G_P(s)}{1 + \{C^*(s) + H(s)\} \cdot G_P(s)} \times \quad (48)$$

$$SV + \frac{G_P(s)}{1 + \{C^*(s) + H(s)\} \cdot G_P(s)} \times D$$

By substituting C*(s) and H(s) of Eqs. (46) and (47) into Eq. (48), the denominators for both the set point value SV and the disturbance D are the ones in the general expression for the proportional, integral, and differential controls with the control constants Kp, $T_I$, and $T_D$ in the optimum condition of characteristics for suppressing disturbance, and only the numerator for the term of set point value can be varied by the adjusting parameters α, β, and γ. Because of this, it becomes possible to optimize freely only the characteristics for the set point value SV as is desired, under the condition in which the characteristics for the disturbance are kept fixed at the optimum values.

$$PV = \frac{K_P\left((1+\alpha) + \left(\frac{1}{T_I \cdot s} - \frac{\beta}{1+T_I \cdot s}\right) + (1-\gamma) \cdot T_D \cdot s\right) \cdot G_P(s)}{1 + \left\{K_P\left(1 + \frac{1}{T_I \cdot s} + T_D \cdot s\right)\right\} \cdot G_P(s)} \times SV +$$

$$\frac{G_P(s)}{1 + \left\{K_P\left(1 + \frac{1}{T_I \cdot s} + T_D \cdot s\right)\right\} \cdot G_P(s)} \times D$$ (49)

Moreover, since the response compensates the integration term by a first order lag element, it satisfies, as mentioned earlier, the condition for setting the process in the steady state, namely, the final value theorem.

Furthermore, the values of the adjusting parameters $\alpha$, $\beta$, and $\gamma$ can be determined from the values of the control constants $K_P$, $T_I$, and $T_D$ for the characteristics for suppressing disturbance and the values of the control constants $K_P^*$, $T_I^*$, and $T_D^*$ for the characteristics for following set point value that may be given by CHR method or the like.

Namely, $\alpha$ can be determined from $K_P(1-\alpha)=K_P^*$ as $$\alpha = 1 - \frac{K_P^*}{K_P},$$

and can be determined from $$K_P(1-\gamma) \cdot T_D$$
$$= K_P^* \cdot T_D^*$$

as $$= 1 - (1-\alpha) \times \frac{T_D^*}{T_D};$$

Further, as to $\beta$, by setting $$\left(\frac{1}{T_I \cdot s} - \frac{\beta}{1+T_I \cdot s}\right) = \frac{\beta_o}{T_I \cdot s},$$

one obtains from $$\frac{K_P \cdot \beta_o}{T_I \cdot s} = \frac{K_P^*}{T_I^* \cdot s} \text{ as } \beta_o = (1-\alpha) \times \frac{T_I}{T_I^*},$$

and according to the result of a simulation an optimum value is in the neighborhood of $$\beta = \tfrac{1}{2} \times \beta_o$$

When the values of the adjusting parameters are determined in the above manner, it is possible to adjust the system to an optimum condition of characteristics for suppressing disturbance by setting the values of the control constants $K_P$, $T_I$, and $T_D$ such that the response of the control value PV, for the case of a step change in the set point value, has the desired following characteristics.

In this way, when the control value PV is varied due to a disturbance D, in the condition where the control constants are virtually set in an optimum condition of characteristics for both disturbance suppression and set point value following, the control operation unit 109 determines, for the deviation due to the above variation, an adjusted output based on the control constants for the condition for following the set point value. A compensatory output a(s) computed in the operation unit 111 based only on the control value PV, independently from the set point value SV, is added to the adjusted output, and the result is output equivalently as a condition for suppressing disturbance.

Referring to FIG. 58, a twenty-fifth embodiment of the invention is illustrated in which a process value feedback compensation unit constitutes a second compensatory operation unit.

A set point value feedback compensation unit 113 inputs a control value PV and performs a compensatory operation which is based on the transfer function F(s) given by Eq. (50). For the deviation E due to variations in the control value PV, it supplies to an operation unit 115 a compensating value f which causes the control constants $K_P^*$, $T_I^*$, and $T_D^*$ that are adjusted to the optimum condition of characteristics for following set point value to correct equivalently to those for the optimum condition of characteristics for suppressing disturbance. The operation unit 115 subtracts the compensating value f from the adjusting output u, which comes from the control operation unit 39, to obtain the compensatory adjusted output u' which is then output to an operation unit 41.

$$F(s) = K_P\left((\alpha - 1) + \frac{\beta}{1+T_I \cdot s} + \frac{(\gamma-1) \cdot T_D \cdot s}{1+\eta \cdot T_D \cdot s}\right)$$ (50)

Since, however, the compensating value f corrects not only the characteristics for suppressing disturbance but also the characteristics for following the set point value, the compensatory adjusted output u' improves the characteristics for suppressing disturbance but deteriorates the characteristics for following set point value. The set point value feedforward compensation unit 33 prevents the deterioration in the characteristics for following set point value by performing a compensatory operation to the set point value SV based on a transfer function H(s) which corresponds to the transfer function F(s) of the process value feedback compensation unit 113, and outputs the compensating value h obtained to the operation unit 41. The arithmetic unit 41 adds the compensating value h to the compensatory adjusted output u' to output the result to the control object 37.

Next, there will be given a description about the principle by which it is possible to accomplish optimization for both of the characteristics for following set point value and for suppressing disturbance, by selecting the contents of the two compensatory means in the present embodiment. First, it should be remembered that since the control constants of the control operation unit 39 are adjusted to the optimum condition of characteristics for following set point value, when there is no compensation in both compensating units 33 and 113 the control value PV optimally follows changes in the set point value SV as shown by Eq. (51) where C* is a transfer function and 6p(s) is a function.

$$PV = \frac{C(s) \cdot G_p(s)}{1 + C(s) \cdot G_p(s)} \times SV + \frac{G_p(s)}{1 + C(s) \cdot G_p(s)} \times D \quad (51)$$

Since, however, the response by Eq. (51) has weak suppression characteristics for a disturbance D, there is supplied a set point value feedback compensation unit 113 to correct the control constants equivalently to the characteristics for suppressing disturbance, as seen from Eq. (52), for improving the disturbance characteristics.

$$PV'' = \frac{C^*(s) \cdot G_p(s)}{1 + \{C^*(s) + F(s)\} \cdot G_p(s)} \times \quad (52)$$

$$SV + \frac{G_p(s)}{1 + \{C^*(s) + F(s)\}} \times D$$

However, the transfer function F(s) for compensating for the suppression of disturbance not only affects the response to the disturbance D but also affects the set point value SV.

For this reason, there is provided the set point value feedforward compensation unit 115, to manipulate only the characteristics for following the set point value SV, by fixing the response to the disturbance D. As a result of such a compensation, the control response of the process will become as shown by Eq. (53).

$$PV = \frac{\{C^*(s) + H(s)\} \cdot G_p(s)}{1 + \{C^*(s) + F(s)\} \cdot G_p(s)} \times \quad (53)$$

$$SV + \frac{G_p(s)}{1 + \{C^*(s) + F(s)\} \cdot G_p(s)} \times D$$

According to Eq. (53), the suppression characteristics for disturbance D is adjusted by $\{C^*(S) + F(s)\}$ while the following characteristics for set point value SV is adjusted by $\{C^*(s) + H(s)\}/\{1 + C^*(s) + F(s)\}$.

Next, the transfer function F(s) for the control value feedback compensation unit 113 will be determined based on the response given by Eq. (53). Namely, if the transfer function C(s) for making the characteristics for suppressing disturbance D to be an optimum characteristics condition is defined by Eqs. (54) and (55), the transfer function F(s) can be computed by Eqs. (56) and (57).

$$C^*(s) = K_P^* \left\{ \alpha + \left( \frac{1}{T^*_I \cdot s} + \frac{\beta}{1 + T^*_I \cdot s} \right) + \quad (54) \right.$$

$$\left. \frac{\gamma \cdot T^*_D \cdot s}{1 + \eta \cdot \gamma \cdot T^*_D \cdot s} \right\}$$

$$= K_P \left( 1 + \frac{1}{T_I \cdot s} + \frac{T_D \cdot s}{1 + \eta \cdot T_D \cdot s} \right) \quad (55)$$

In the above equation, $K^*_p$, $T^*_I$ and $T^*_D$ are the control constants for the optimum condition of characteristics for following set point value, Kp, $T_I$, and $T_D$ are the control constants for the optimum condition for suppressing disturbance, and $\alpha$, $\beta$ and $\gamma$ are adjusting parameters.

$$C^*(s) + F(s) = C(s), \quad (56)$$

$$F(s) = C(s) - C^*(s) \quad (57)$$

$$= K^*_P \left( (\alpha - 1) + \frac{\beta}{1 + T^*_I \cdot s} \right.$$

$$\left. + \frac{(\gamma - 1) \cdot T^*_D \cdot s}{1 + \eta \cdot T^*_D \cdot s} \right)$$

In order for this transfer function to be proper, the control response of the process has to satisfy the final value theorem. Namely, when the set point value SV is changed by a fixed amount in step-like manner, the deviation must be zero in a steady state. In order to satisfy the above condition, Eq. (58) has to be fulfilled and in turn Eq. (70) has to be fulfilled.

$$\lim_{s \to 0} \frac{C^*(s) \cdot G_p(s)}{1 + \{C^*(s) + F(s)\} \cdot G_p(s)} = 1 \quad (58)$$

$$\lim_{s \to 0} \frac{F(s)}{C^*(s)} = 0 \quad (59)$$

When the expressions for the transfer functions F(s) and C*(s) are substituted into Eq. (59), the term in F(s) corresponding to the integration term $1/T^*_I \cdot s$ in C*(s) is the first order lag term $1/(1 + T_I \cdot s)$ so that it is clear that F(s) satisfies Eq. (59) as the denominator tends to infinity when s→o.

Next, the transfer function H(s) for the set point value feedforward compensation unit 33 will be derived. This function is for recovering the following characteristics for the set point value SV which is changed by the action of the control value feedback compensation unit 113 as shown by Eq. (52). When the response to the set point value given by Eq. (53) is corrected as given by Eq. (51), the following equation is obtained.

$$\frac{C^*(s)}{C^*(s)} = \frac{C^*(s) + H(s)}{C^*(s) + F(s)} \quad H(s) = F(s) \quad (60)$$

However, according to Eq. (60), the response to the set point value overshoots as can be seen from Eq. (53). Because of this, Eq. (60) is modified to Eq. (61) using a coefficient k ($0 \leq k \leq 1$) to manipulate only the characteristics for following set point value by varying the value of k.

$$H(s) = k \times F(s) \quad (61)$$

In this manner, the control constants Kp, $T_I$, and $T_D$ are corrected equivalently in a mutually independent fashion depending upon the compensatory action, in order to obtain optimum characteristics for both disturbance suppression and set point value following.

Next, an example will be described for computing the values of the adjusting parameters $\alpha$, $\beta$, and $\gamma$ for setting the values of the transfer function F(s) for the control value feedback compensation unit and the transfer function H(s) for the set point value feedforward compensation unit.

Namely, comparing the operations in Eqs. (54) and (55), it is seen for the proportional operation that $$K^*_P \times \alpha = K_P \therefore \alpha = \frac{K_P}{K^*_P} \quad (62)$$

Further, by setting $\{1/T^*_I\cdot s+\beta/(1+T^*_I\cdot s)\}$ in Eq. (54) to $\beta/T_I\cdot s$, for the integral operation part one obtains.

$$\frac{K^*_P x}{T^*_I \cdot s} = \frac{K_P}{T_I \cdot s} \therefore \beta = \alpha \times \frac{T^*_I}{T_I} = 2 \times \beta \quad (63)$$

Moreover, for the differential operation part $$K^*_P \times \frac{\gamma \cdot T^*_D \cdot s}{1 + \eta \cdot T^*_D \cdot s} = K_P \times \quad (64)$$

$$\frac{T_D \cdot s}{1 + \eta \cdot T^*_D \cdot s} \therefore \gamma = \alpha \times \frac{T_D}{T^*_D}$$

Since $K_P$, $T_I$, $T_D$, $K_P^*$, $T_I^*$ and $T_D^*$ can be obtained by CHR method or the like, the values for $\alpha$, $\beta$, and $\gamma$ can be found.

As in the above, when the control constants $K_P^*$, $T_I^*$ and $T_D^*$ are adjusted to the optimum condition of characteristics for following set point value, the present embodiment corrects for variations due to disturbances the control constants equivalently to those for the optimum condition of characteristics for suppressing disturbance by means of the compensating action which is based on the transfer function F(s) for the set point value feedback compensation unit 113. However, the compensation action deteriorates the characteristics for following set point value. In order to recover and compensate for the deterioration, there is applied, for the component corresponding to the change in the set point value SV, a compensatory operation is performed based on the transfer function H(s) for the set point value feedforward compensation unit 33. In this manner, it becomes possible to realize an optimum condition of characteristics for both disturbance suppression and set point value following. In addition, the response can be optimized freely and independently by adjusting the coefficient k in Eq. (61) for following the set point value to adjust the overshoot, and by varying the parameters $\alpha$, $\beta$, and $\gamma$ in suppressing disturbance.

An example of the response of the present embodiment is shown in FIG. 59(A) and (B) in which the transfer function F(s) for the control value feedback compensation unit 113 consists solely of the proportional compensation, $K_P^* \times (\alpha - 1)$. In the example, the characteristics for suppressing disturbance is improved by increasing the value of $\alpha$ from $\alpha = 1$ (no compensation) to larger values, without changing the characteristics for following the set point value (k=constant).

Figure 60:
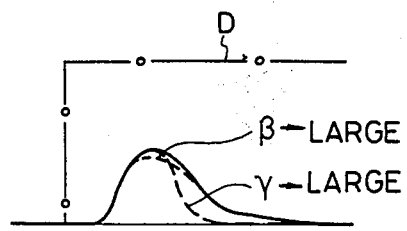

Further, as shown in FIG. 60, the value of $\beta$ varies equivalently the integral time of the characteristics for suppressing disturbance. By the use of this parameter it is possible to decrease the maximum value of the variation. The parameter $\gamma$ can change the derivative time so that it becomes possible to suppress the disturbance quickly.

Although in the description some embodiments have been made of the perfect differentiaions while others of the imperfect differentiations, it is easily understood that the differentiations of the two types can be mutually interchangeable in any embodiment. Also it should be noted that the present invention is freely applicable to both the position-type operation system and the velocity-type operation system that is widely being used in direct digital control.

Various modifications will become possible for those skilled in the art after receiving the teachings of the present disclosure without departing from the scope thereof.

What is claimed is:

1. A process controller comprising:
   deviation calculating means for calculating the deviation between a control value obtained from a controlled object and a set value for the control value;
   control means for performing proportional and integral operations with respect to the deviation based on a control parameter in a characteristic state for optimally suppressing variation due to a disturbance; and
   compensating means for correcting, with respect to the set value, the control parameter in a characteristic state for optimally following changes in the set value based on at least one adjusting parameter calculated in accordance with the control parameter for the proportional operation.

2. A process controller as claimed in claim 1, wherein said adjusting parameter in the compensating means is set to be a predetermined value, and the value of said control parameter in the control means is adjusted such that the following response to the control value from the controlled object, with respect to the set value for the control value, is optimum when the set value for the control value is changed stepwise through the compensating means.

3. A process controller comprising:
   deviation calculating means for calculating the deviation between a control value obtained from a controlled object and a set value for the control value;
   control means for performing at least one of proportional and integral operations with respect to the deviation based on at least one control parameter adjusted by a first predetermined parameter value in a characteristic state for optimally suppressing variation due to a disturbance, said control means outputting an adjusting signal used for controlling the controlled object based on at least one of the said proportional and integral operations; and
   compensating means for, with respect to the set value, correcting said control parameter to a second predetermined parameter value in a characteristic state for optimally following change in the set value based on at least one adjusting parameter calculated in accordance with the first and second parameter values.

4. A process controller as claimed in claim 3, wherein said compensating means calculates a changed set value based on said adjusting parameter and outputs said changed set value to the deviation calculating means.

5. A process controller as claimed in claim 4, wherein said compensating means inputs said control value from the controlled object to perform a compensating operation with respect to the control value.

6. A process controller as claimed in claim 3, wherein said compensating means comprises a lead-lag calculating means having a lead-lag transfer function in calculating said adjusting parameter.

7. A process controller as claimed in claim 6, wherein said lead-lag transfer function comprises $(1+\alpha T_I S)$ where $\alpha$ is the adjusting parameter which is the second parameter value for the proportional operation divided by the first parameter value, and $T_I$ is the control parameter for the integral operation, and S is a complex variable.

8. A process controller as claimed in claim 6, wherein said lead-lag calculating means comprises a pair of lead-lag elements connected to each other.

9. A process controller as claimed in claim 3, wherein said compensating means comprises a calculating means having a lag transfer function for calculating said adjusting parameter and a lead transfer function for calculating said control parameter for the integral operation.

10. A process controller as claimed in claim 9, wherein said lag transfer function comprises $\beta/(1+T_I S)$ where $\beta$ is a first adjusting parameter which is the first parameter value for the integral operation divided by the second parameter value for the integral operation and multiplied by a second adjusting parameter $\alpha$.

11. A process controller as claimed in claim 9, wherein the first predetermined parameter value for the integral operation is changed by said lag transfer function to the second predetermined value.

12. A process controller as claimed in claim 3, wherein said optimum suppressing characteristic state comprises a short time period for suppressing said variation.

13. A process controller as claimed in claim 3, wherein said optimum following characteristic state comprises that the response to the change in the set value is fast and there is less overshoot.

14. A process controller as claimed in claim 3, wherein said control means performs a differential operation with respect to said deviation.

15. A process controller as claimed in claim 14, wherein said compensating means comprises a calculating means having a first lead transfer function for calculating said adjusting parameter and the control parameter for the differential operation, and a second lead transfer function for calculating the control parameter for the integral operation.

16. A process controller as claimed in claim 15, wherein said first lead transfer function comprises $\gamma T_D S/(1+\gamma\eta T_D S)$ where $T_D$ is the control parameter for the differential operation, and $\gamma$ is a first adjusting parameter which is the second parameter value for the differential operation divided by the first parameter value for the differential operation and mutliplied by a second adjusting parameter $\alpha$, and $\eta$ is a third adjusting parameter.

17. A process controller as claimed in claim 3, wherein said control means comprises an integral calculating means for performing the integral operation with respect to said deviation from the deviation calculating means, and a proportional calculating means for performing the proportional operation with respect to the output from the integral calculating means.

18. A process controller as claimed in claim 17, wherein a lead-lag calculating means is disposed to perform lead and lag operations with respect to the control value, and said integral calculating means performs the integral operation and first order lag operation.

* * * * *